US007542869B2

(12) United States Patent
Gandelsman et al.

(10) Patent No.: US 7,542,869 B2
(45) Date of Patent: Jun. 2, 2009

(54) ELECTROMAGNETIC TRACKER

(75) Inventors: Mark Gandelsman, Haifa (IL); Giora Kornblau, Binyamina (IL)

(73) Assignee: Elbit Systems Ltd., Haifa (IL)

( * ) Notice: Subject to any disclaimer, the term of this patent is extended or adjusted under 35 U.S.C. 154(b) by 45 days.

(21) Appl. No.: 11/791,295

(22) PCT Filed: Nov. 16, 2005

(86) PCT No.: PCT/IL2005/001214

§ 371 (c)(1),
(2), (4) Date: May 21, 2007

(87) PCT Pub. No.: WO2006/054295

PCT Pub. Date: May 26, 2006

(65) Prior Publication Data

US 2007/0299623 A1    Dec. 27, 2007

(30) Foreign Application Priority Data

Nov. 21, 2004  (IL) .................................... 165314

(51) Int. Cl.
*G06F 19/00* (2006.01)
(52) U.S. Cl. ..................................... 702/152; 702/150
(58) Field of Classification Search ................. 702/95, 702/152, 153, 150
See application file for complete search history.

(56) References Cited

U.S. PATENT DOCUMENTS

| | | | |
|---|---|---|---|
| 5,646,525 A * | 7/1997 | Gilboa ................... 324/207.17 |
| 5,847,976 A | 12/1998 | Lescourret et al. | |
| 6,201,987 B1 * | 3/2001 | Dumoulin ................... 600/424 |
| 6,380,732 B1 * | 4/2002 | Gilboa ................... 324/207.17 |
| 6,400,139 B1 * | 6/2002 | Khalfin et al. ......... 324/207.17 |
| 6,516,213 B1 | 2/2003 | Nevo | |
| 6,534,982 B1 * | 3/2003 | Jakab ........................ 324/318 |
| 6,774,624 B2 * | 8/2004 | Anderson et al. ...... 324/207.17 |

(Continued)

OTHER PUBLICATIONS

International Search Report for PCT/IL2005/001214 (5 pages).

(Continued)

*Primary Examiner*—Edward R Cosimano
*Assistant Examiner*—Douglas N Washburn
(74) *Attorney, Agent, or Firm*—Steven M. Jensen; Edwards Angell Palmer & Dodge LLP

(57) ABSTRACT

Apparatus for adaptively tracking the position of an object in a volume of interest, the apparatus including at least one transmitter, at least one sensor assembly, and a tracking processor, the transmitter being coupled with the volume of interest, for transmitting a multiple axis, time variant, electromagnetic field through the volume of interest, the sensor assembly including at least three sensors, the sensor assembly being coupled with the object, each of the three sensors respectively measuring a respective component of the electromagnetic field, the tracking processor being coupled with the transmitter and the sensor assembly, wherein the tracking processor produces and adapts a mathematical field model describing the electromagnetic field, the tracking processor further produces and adapts a mathematical sensing model, for compensating the effect of the translational and rotational velocity of each of the sensors, wherein the tracking processor estimates the position of the object from the measured respective components of the electromagnetic field, the field model and from the sensing model.

96 Claims, 6 Drawing Sheets

U.S. PATENT DOCUMENTS 6,980,921 B2 * 12/2005 Anderson et al. ........... 702/150
2002/0030483 A1 3/2002 Gilboa
2003/0139895 A1 7/2003 Lescourret
2004/0107070 A1 6/2004 Anderson et al.

OTHER PUBLICATIONS

Written Opinion of the International Searching Authority for PCT/IL2005/001214 (5 pages).

* cited by examiner

ELECTROMAGNETIC TRACKER

CROSS-REFERENCE TO RELATED APPLICATIONS

This is a national stage filing which is based on and claims priority to and the benefit of International Application Number PCT/IL2005/001214 which itself is based on and claims priority to and the benefit of IL Patent Application Number 165314. International Application Number PCT/IL2005/001214 was filed on Nov. 16, 2005, and it was published as International Publication Number WO 2006/054295 A1 on May 26, 2006. IL Patent Application Number 165314 was filed on Nov. 21, 2004. The entirety of each of these applications is incorporated herein by reference.

FIELD OF THE DISCLOSED TECHNIQUE

The disclosed technique relates to electromagnetic trackers in general, and to methods and systems for modeling an electromagnetic field and calibrating sensing coils adaptively in an electromagnetic tracker, in particular.

BACKGROUND OF THE DISCLOSED TECHNIQUE

Electromagnetic trackers find use in a wide range of applications, ranging from video game systems and computer graphics to medical technologies and military uses. The main purpose of a tracker, in general, is to continuously determine the position of a moving object in real-time. Determining the position may include determining the physical location of the object, and the orientation of the object with respect to a coordinate system. For example, the continuously determined position may be used to control an object, like a medical probe, or to estimate the line of sight to a target.

In particular, electromagnetic trackers function by generating an electromagnetic field in the physical space in which an object is to be tracked. This physical space is referred to as a motion box in the art. The electromagnetic field is generated by one or more transmitters located on the electromagnetic tracker. A sensor is generally attached to the tracked object, which can determine a characteristic property of the electromagnetic field as a function of the physical location of the tracked object. It is common practice to determine a characteristic property of the electromagnetic field which involves the principle of electromagnetic induction. The measure of the characteristic property can be used to determine the position of the tracked object.

The sensor, attached to the tracked object, commonly measures the magnetic field strength at a single point in the motion box of the electromagnetic tracker, either as a vector or as the components of a vector. This single point is by and large related to the geometric center of the sensor. This measure is generally to a high degree of precision and is achieved by using sensors with a high degree of symmetry. For example, if the sensor is coil based, the coils should be concentric to a high degree of precision. Such sensors generally require a sophisticated calibration process, which is normally executed using a specially designed calibration setup. Over time, with general use and wear-and-tear, the geometric properties of a sensor change, and the calibration parameters of the sensor drift from their original values. This change in values necessitates a periodic replacement of the sensor along with a recalibration of the sensor, a process which is both time consuming and not cost effective. Furthermore, when coil based sensors are used in the presence of a non-uniform electromagnetic field, the finite time required to measure the magnetic field strength causes a distortion in that measurement. The amount of distortion increases as the velocity of the sensors increases. If the translational and rotational velocity of the sensors is faster than velocities typical of hand movements, then electromagnetic trackers tend to exhibit a significant decrease in tracking accuracy.

The magnetic field strength, measured by the sensor, is related to the position of the tracked object by a mathematical model describing the electromagnetic field generated by the electromagnetic tracker. The electromagnetic field generated by the electromagnetic tracker results from electric currents flowing in the transmitter, as well as from induced electric currents arising in metallic objects, which are located in the vicinity of the motion box of the electromagnetic tracker. The electromagnetic field generated is therefore dependent on the particular environment in which the electromagnetic tracker is used in. Any change in the position of metallic objects, in the vicinity of the motion box, requires updating the mathematical relations found between magnetic field strength measurements of the sensor and the position of the sensor. It is common practice to account for induced electric currents, which contribute to the electromagnetic field, in the mathematical model, by mapping the magnetic field strength for each position in the motion box, in a particular environment. The mathematical model parameters are then estimated to best fit the position and magnetic field strength measurements of the sensor to the mapping. The parameters are stored in the memory of the electromagnetic tracker and are used to estimate the position of the sensor in real-time.

In order for the electromagnetic tracker to work in multiple environments, multiple mappings of the electromagnetic field need to be executed in a variety of environments. Furthermore, metallic objects in the vicinity of the motion box of the electromagnetic tracker may change their position, or new metallic objects may be present in the vicinity of the motion box. Both of these situations necessitate a remapping of the motion box. These mappings can be very time consuming. Taken in conjunction with the recalibration needs of the sensor, the maintenance of an electromagnetic tracker can be cumbersome. In general, the analog hardware used in electromagnetic trackers needs to be of high precision and stability, which enables the analog hardware to be replaced when needed without changing the calibration parameters of the sensor or the estimated parameters of the mathematical model. Otherwise, replacement of the analog hardware may necessitate a recalibration of the sensor and a remapping of the electromagnetic field in the motion box of the electromagnetic tracker.

U.S. Pat. No. 6,534,982 issued to Jakab, entitled "Magnetic resonance scanner with electromagnetic position and orientation tracking device" is directed to a system and method for determining the position and orientation of an object in a magnetic resonance scanner. In this reference, the magnetic resonance scanner is used in conjunction with an electromagnetic position and orientation tracking device to calculate the position and orientation of an object within the magnetic resonance scanner. The electromagnetic tracker may be used to track the object and a target, relative to a reference coordinate frame. Magnetic fields are used for location tracking of the object.

The magnetic field is generated by applying an electric current to a conductive wire loop. The generated magnetic field is sensed by a magnetic field sensor attached to the object. In the magnetic field sensor, an electric signal is measured which is proportional to the magnetic field. The electric signal is used to calculate the magnetic field by a magnetic field sensing model. For a solenoid type coil sensor, the magnetic field sensing model used is Faraday's Law of Induction. Models for other types of magnetic field sensors can be used, where the magnetic field sensing model is derived based upon the physical laws that dictate the operation of that sensor.

Using a model of the generated magnetic field, at an estimated location in the reference coordinate frame, an estimated magnetic field can be calculated. The magnetic field generation model includes a line segment approximation of the shape of the magnetic field source and additional line segments accounting for components that distort the magnetic field. The model compensates for distortions in the estimated magnetic field at the sensor, by accounting for the magnetic field generated by the gradient coils in the magnetic resonance scanner and for the magnetic fields generated by any surrounding conductive and ferromagnetic materials. The location and direction of the line segments is determined through test measurements of the currents in the gradient coils and the resulting magnetic fields. The Biot-Savart Law is used in the magnetic field generation model to calculate the magnetic field generated by each line segment.

Comparing the estimated magnetic field to the measured magnetic field, an error is computed. The estimated location of the magnetic field sensor is then changed and the steps repeated until the error between the estimated magnetic field and the measured magnetic field falls below an acceptable level. When the error falls below the acceptable level, the location of the sensor, based on its estimated location, provides a representation of the actual location of the sensor.

U.S. Pat. No. 6,400,139 issued to Khalfin et al., entitled "Methods and apparatus for electromagnetic position and orientation tracking with distortion compensation" is directed to distortion compensation in electromagnetic position and orientation tracking systems. The method of Khalfin is applicable specifically to electromagnetic tracking systems where the components of an AC electromagnetic field are sensed within a bounded volume. One or more probe sensors are placed on an object being tracked within the bounded volume. Each probe measures the magnetic induction vector components of the field generated by an electromagnetic radiation source, to determine the position, orientation and movement of the object within the bounded volume. To compensate for electromagnetic distortion, the method of Khalfin employs at least one stationary sensor, termed a witness sensor, in addition to the probe sensor(s) disposed on the object. Each witness sensor is supported at a known, fixed position and orientation relative to a reference frame of interest, at a point near or within the bounded volume, and close to the sensors on the object being tracked.

The measurements of each probe sensor, and each witness sensor, are provided to a processing unit operative to compute the position and orientation of the object in the presence of electromagnetic field distortions. The processor uses data from each witness sensor to compute parameters, such as the position, orientation and strength, of an effective electromagnetic source or sources. The effective source(s), which may be treated for the sake of simplicity as a point source or a dipole, produce the same electromagnetic field as a superposition of the real electromagnetic field, in addition to the field distortion in the proximity of the witness sensors. In the case of a non-distorted environment, the effective source(s) will be identical to the real source. This equality allows the computed parameters of the effective source(s) to be used as inputs to the computation of the position and orientation, as measured by each probe sensor, as if the object is in the non-distorted electromagnetic field produced by the effective source(s).

U.S. Pat. No. 6,201,987 issued to Dumoulin, entitled "Error compensation for device tracking systems employing electromagnetic fields" is directed to a system for the real-time localization of a device using electromagnetic (or Radio Frequency) fields, which compensates for eddy currents in the presence of eddy current inducing structures. The system is augmented with hardware and/or software which compensates for the eddy currents and is capable of more accurately tracking an invasive device in the body of a subject. In the system of Dumoulin, current patterns applied to transmit coils of the tracking system are modified to compensate for the effect of the eddy currents. Eddy currents are compensated for by modifying the waveforms which are applied to the transmitter coils. Ideally, in the absence of eddy currents, the current and the resulting applied field are uniform in time. In the presence of electrically conducting structures, however, eddy currents are created, which oppose the field created by the transmit coil. These currents, and the field created by them, decay over time.

The modified waveform of the current supplied to the coils is a linear combination of the current needed to create the desired electromagnetic field in the region of interest, and one or more error terms. The error terms are determined experimentally during system calibration and are mathematically modeled as a series of exponential functions having a given amplitude and time constant. The error terms, in the current applied to the transmit coils, effectively cancel the magnetic fields created by eddy currents within the tracking region and result in an actual electromagnetic field which is close to the desired ideal electromagnetic field. The fidelity of the electromagnetic field is further increased by reducing eddy currents within the eddy current inducing structures. This is done by constructing shield coils which are placed between the transmit coil and the eddy current inducing structures. Magnetic fields are created by these shield coils which cancel the magnetic fields created within the eddy current inducing structures without substantially altering the electromagnetic fields in the region over which the invasive device is tracked.

U.S. Pat. No. 5,646,525 issued to Gilboa, entitled "Three dimensional tracking system employing a rotating field" is directed to a system for determining the position and orientation of a helmet worn by a crew member in a vehicle. The vehicle includes a generator, which produces a rotating magnetic and electric dipole field of fixed strength, orientation and frequency within a portion of the vehicle. The system includes a plurality of sensors which each generate a signal proportional to the electric or magnetic fields detected at a point associated with the helmet. The sensors each comprise three orthogonal coils or three orthogonal detectors, such as Hall detectors. The system also includes calculation circuitry responsive to the generated signal for ascertaining the coordinates of the point with respect to the generator, using a simple mathematical model, and for determining the position and orientation of the helmet.

The generated signal is proportional to the time derivative of the magnetic field flux along the axis of a particular coil, or detector, in the sensor. Since the generator produces a rotating magnetic dipole field, the magnetic field strength, and hence the magnitude of the generated signal, at a specific point in space, will oscillate in time between a maximum and a minimum value. According to the simple mathematical model, the maximum and minimum values will depend only on the elevation angle of the point from the generator and the distance of the point from the generator. By determining the maximum and minimum of the square of the electric and magnetic field strengths, the calculation circuitry can determine the position and orientation of the helmet.

SUMMARY OF THE DISCLOSED TECHNIQUE

It is an object of the disclosed technique to provide a novel method and system for tracking an object, which overcomes the disadvantages of the prior art.

In accordance with the disclosed technique, there is thus provided an apparatus for adaptively tracking the position of an object in a volume of interest. The apparatus includes at least one transmitter, at least one sensor assembly, and a tracking processor. The sensor assembly includes at least three sensors. The three sensors are arranged in a fixed configuration at different predetermined locations and orientations. The transmitter is coupled with the volume of interest. The sensor assembly is coupled with the object. The tracking processor is coupled with the transmitter and the sensor assembly. The transmitter transmits a multiple axis, time variant, electromagnetic field through the volume of interest.

Each of the three sensors respectively measures a respective component of the electromagnetic field. The tracking processor produces and adapts a mathematical field model describing the electromagnetic field. The mathematical field model is at least based on the multiple axis, time variant, electromagnetic field, the fixed configuration of the three sensors, and on the measured respective components of the electromagnetic field. The tracking processor further produces and adapts a mathematical sensing model, for compensating the effect of the translational and rotational velocity of each of the three sensors. The tracking processor estimates the position of the object from the measured respective components of the electromagnetic field, the field model and from the sensing model. The tracking processor stores calibration parameters associated with the sensor assembly. The position of the object includes the physical location of the object and the orientation of the object.

According to another aspect of the disclosed technique, there is thus provided a method for adaptively tracking the position of an object in a volume of interest. The method includes the procedures of transmitting a multiple axis, time variant, electromagnetic field through the volume of interest, and measuring a respective component of the electromagnetic field, in at least one sensor assembly. The method further includes the procedures of producing a mathematical field model describing the electromagnetic field, and producing a mathematical sensing model for compensating the effect of the translational and rotational velocity of each of the three sensors. The method further includes the procedure of determining the position of the object from the measured respective components of the electromagnetic field, the field model and from the sensing model.

The sensor assembly includes at least three sensors. The three sensors are arranged in a fixed configuration at different predetermined locations and orientations. The field model is based on the multiple axis, time variant, electromagnetic field, the fixed configuration of the three sensors and on the measured respective components of the electromagnetic field. The position of the object includes the physical location of the object and the orientation of the object.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1A:
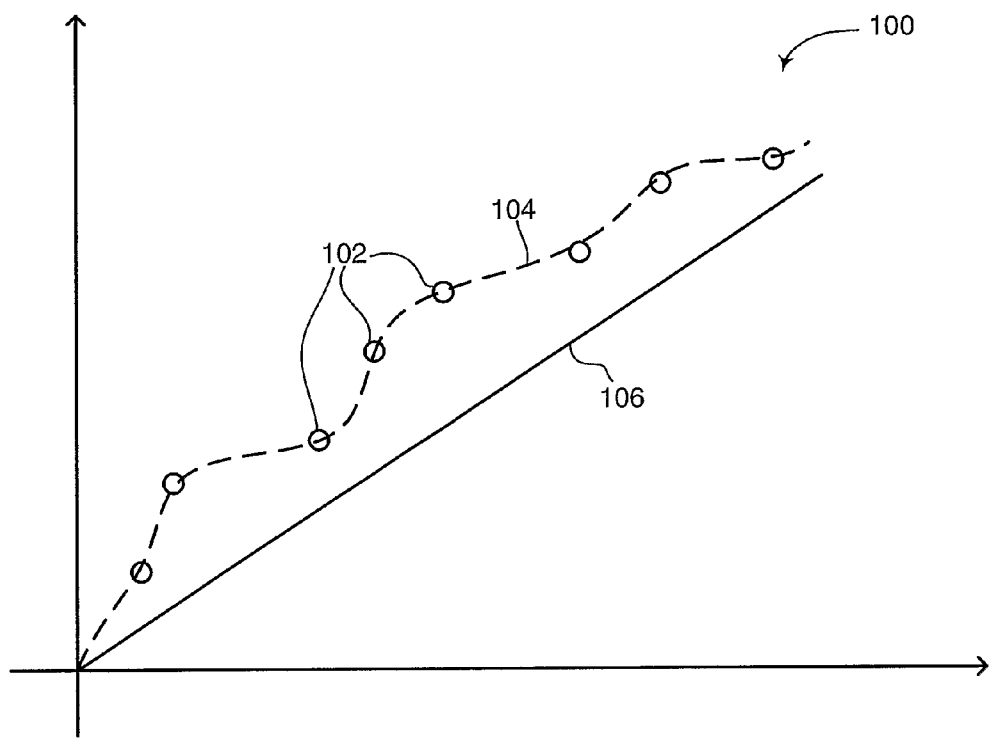
FIG. 1A is a graph, in accordance with an embodiment of the disclosed technique, depicting a known function with analytical solutions and an unknown function connecting data points.

The disclosed technique overcomes the disadvantages of the prior art by providing an adaptive electromagnetic (herein abbreviated EM) tracker system and method. The adaptive tracker generates an EM field by providing an electric current through transmitting coils, located on the tracker. The adaptive tracker constructs and continuously adapts a mathematical model to describe the EM field a tracked object is located in. Simultaneously, the adaptive tracker calibrates sensing coils located on the tracked object, and determines the position of the tracked object in real-time. The adaptive tracker calibrates the sensing coils by constructing and continuously adapting a mathematical sensing model to describe the measurements determined thereto. The adaptive tracker obviates the need to perform a preliminary mapping of the EM field generated by the sensing coils located on the tracker. The adaptive tracker also obviates the need to perform a preliminary calibration of the sensing coils located on the tracked object. The adaptive tracker can be constructed using sensing coils which have no symmetry in their shape. Furthermore, the adaptive tracker does not place a limit on the rotational and translational velocity of the tracked object.

Mathematical functions, herein referred to as functions, equations or expressions, are mathematical relations that associate each element from a set of elements (i.e., the dependent elements), with at least one element from another set of elements (i.e., the independent elements). Functions refer to the relations in general, whereas equations refer to the actual mathematical form of the relations described by the functions. Functions are used, in general, to describe physical phenomena observed in nature, for example the effect of gravity on the velocity of objects falling from the sky, or the strength of an electric field near a power line, as is known in the art. Dependent elements are associated to independent elements, in equations, by variable quantities and constants, both of which are known as parameters in the art. For example, the equation that describes a straight line, $$f(x) = m \cdot x + b \qquad (1)$$

relates the x and y coordinates that describe a straight line, on a Cartesian plane, by 2 constant parameters, m, the slope of the line, and b, the y-intercept of the line, as is known in the art. The x and y coordinates are also considered parameters, as they are variable quantities that determine the form of the equation described in Equation (1).

Theoretical situations of physical phenomena observed in nature, for example a point charge with no charges around it, even at an infinite point from the point charge, can generally be described by equations with analytical solutions that allow the relevant parameters of the equation to be known exactly.

Most situations of physical phenomena observed in nature however, cannot generally be described by equations with analytical solutions, but can rather be approximated, most of the time, by known equations, with numerical solutions. Numerical solutions of known equations are values of the constant parameters of equations that cannot be solved for analytically, and must therefore be approximated, generally by methods executed using a computer.

In general, when a function describing a physical phenomenon observed in nature is sought after, the phenomenon is measured through appropriate units, and the data points measured are plotted on a graph. An equation, or expression, which appears to resemble the shape of the data points is then chosen. Since the chosen equation will not go through all the data points, the constant parameters of the equation need to be altered to best fit the chosen equation with the data points. Alternatively, variable quantities can be added to the chosen equation and altered to best fit the data points. Constant parameters of a known equation, which best fits the data points of a measured phenomenon, may be determined by using a mathematical method known as optimization or minimization. Optimization, or minimization, refers to a technique where parameters are determined such that the difference between the data points of a known equation, and the corresponding data points of an unknown equation, are brought to a minimum.

Reference is now made to FIG. 1A, which is a graph, generally referenced 100, in accordance with an embodiment of the disclosed technique, graphically depicting a known expression with analytical solutions and an unknown expression, which can only be approximated by a known expression, with numerical solutions. Graph 100 includes a plurality of data points 102, an unknown graphed expression 104 and a known graphed expression 106. Data points 102 are measured values of a physical phenomenon in nature. Unknown graphed expression 104 is an expression, which when graphed, connects data points 102 to each other in a sequential manner. The form of unknown graphed expression 104 is not known. Known graphed expression 106 is an expression which describes a straight line. Since data points 102 roughly resemble a straight line, known graphed expression 106 can be used to approximately describe unknown graphed expression 104. Referring to Equation (1), the constant parameters of the expression that describes a straight line are: m, the slope of the line, and b, the y-intercept of the line. In order to best fit known graphed expression 106 to data points 102, the constant parameters of known graphed expression 106 can be minimized to data points 102.

Figure 1B:
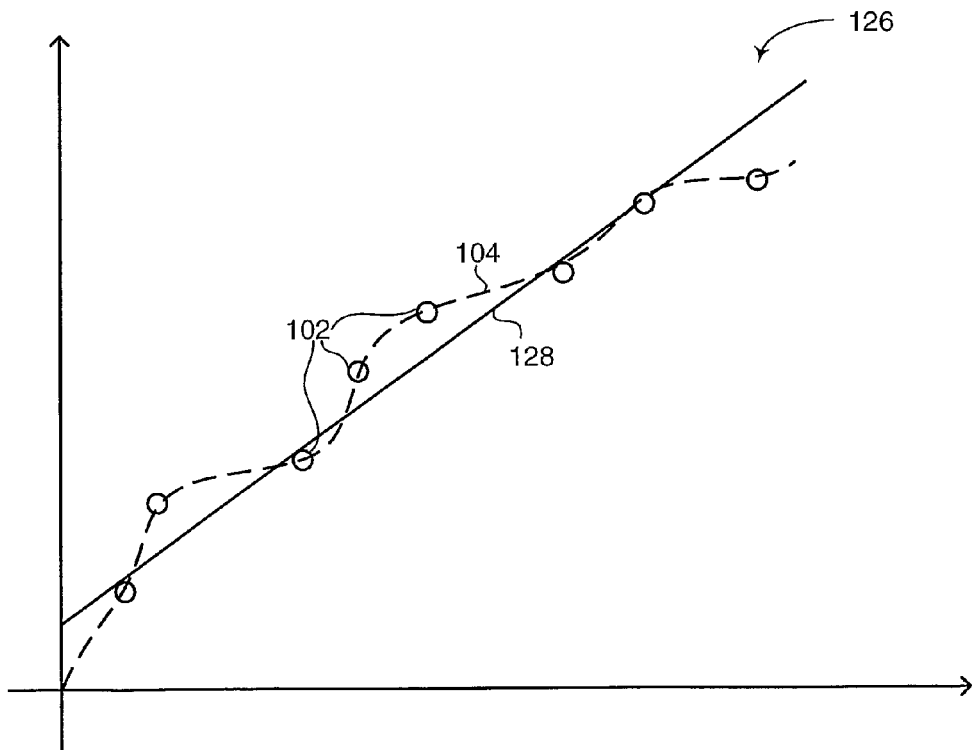
FIG. 1B is a graph, in accordance with an embodiment of the disclosed technique, depicting the known function of FIG. 1A minimized to the data points of FIG. 1A.

Reference is now made to FIG. 1B, which is a graph, generally referenced 126, constructed and operative in accordance with an embodiment of the disclosed technique, depicting the known expression of FIG. 1A minimized to the data points of FIG. 1A. Graph 126 includes a plurality of data points 102, an unknown graphed expression 104 and a minimized known graphed expression 128. Data points 102 and unknown graphed expression 104 are the same as in FIG. 1A. Minimized known graphed expression 128 is an expression that describes a straight line whose constant parameters, m and b, have been determined to best fit data points 102. Minimized known graphed expression 128 is minimized because the difference between data points 102 and corresponding data points on minimized known graphed expression 128 are at a minimum. This is equivalent to stating that minimized known graphed expression 128 best fits data points 102.

Figure 2:
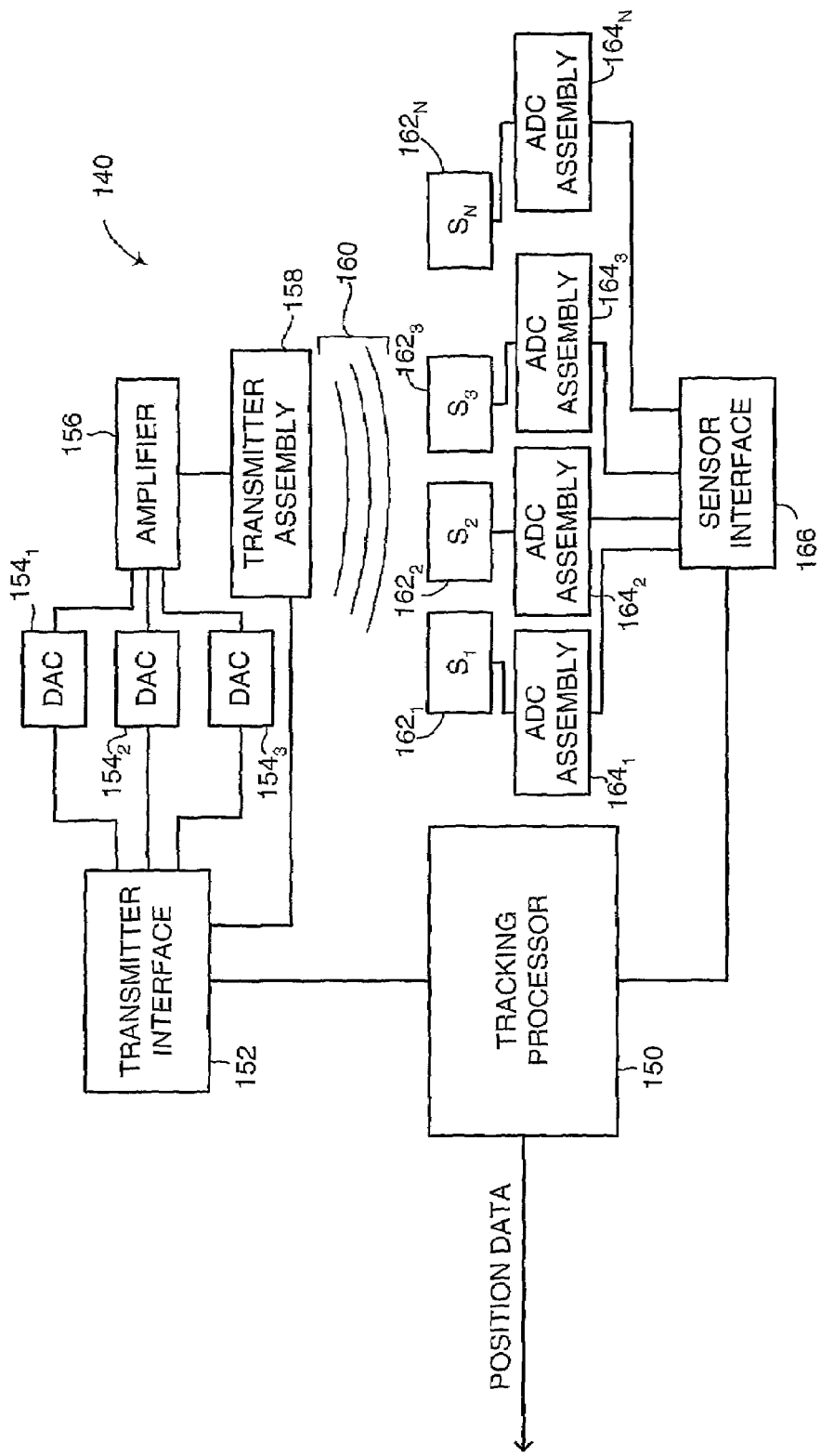
FIG. 2 is a schematic illustration of a system, constructed and operative in accordance with an embodiment of the disclosed technique.

Reference is now made to FIG. 2, which is a schematic illustration of a system, generally referenced 140, constructed and operative in accordance with an embodiment of the disclosed technique. System 140 includes a tracking processor 150, a transmitter interface 152, a plurality of digital to analog converters (DACs) $154_1$, $154_2$ and $154_3$, an amplifier 156, a transmitter assembly 158, a plurality of sensor assemblies $162_1$, $162_2$, $162_3$ and $162_N$, which each include a plurality of sensing coils (not shown), a plurality of analog to digital converter (ADC) assemblies $164_1$, $164_2$, $164_3$ and $164_N$ and a sensor interface 166. In an embodiment of the disclosed technique, ADC assemblies $164_1$, $164_2$, $164_3$ and $164_N$ each include a multiplexer (not shown) and a plurality of ADCs (not shown). Transmitter assembly 158 includes three transmitting coils (not shown). In another embodiment of the disclosed technique, transmitter assembly 158 includes at least one transmitting coil. Sensor assemblies $162_1$, $162_2$, $162_3$ and $162_N$ each include six sensing coils. In another embodiment of the disclosed technique, sensor assemblies $162_1$, $162_2$, $162_3$ and $162_N$ each include at least three sensing coils. ADC assemblies $164_1$, $164_2$, $164_3$ and $164_N$ each include six ADCs. In another embodiment of the disclosed technique, ADC assemblies $164_1$, $164_2$, $164_3$ and $164_N$ each include at least three ADCs. It is noted that each sensing coil in sensor assemblies $162_1$, $162_2$, $162_3$ and $162_N$ has a respective single ADC in ADC assemblies $164_1$, $164_2$, $164_3$ and $164_N$ corresponding to it. It is noted that the plurality of digital to analog converters (DACs) $154_1$, $154_2$ and $154_3$, can include more than three DACs, each respective of a signal to be transmitted.

Tracking processor 150 includes a plurality of sub-processor units (described in FIG. 4) for the following purposes: estimating the position of the sensing coils included in each sensor assembly and any objects associated with such sensing coils, for example a tracked object, adaptively calibrating the sensing coils included in each of sensor assemblies $162_1$, $162_2$, $162_3$ and $162_N$, by constructing and continuously adapting a mathematical sensing model to describe the measurements estimated thereto, and constructing and continuously adapting a mathematical model to describe the EM field the tracked object is located in. The position of a sensing coil can include the physical location of the sensing coil, for example in a coordinate system, or the orientation of the sensing coil with respect to a coordinate system, or both.

Transmitter interface 152 is coupled with DAC units $154_1$, $154_2$ and $154_3$, with tracking processor 150 and with transmitter assembly 158. DAC units $154_1$, $154_2$ and $154_3$ are further coupled with amplifier 156. Amplifier 156 is further coupled with transmitter assembly 158. Sensor assemblies $162_1$, $162_2$, $162_3$ and $162_N$ are further marked $S_1$, $S_2$, $S_3$ and $S_N$, respectively. Analog to digital converter (ADC) assemblies $164_1$, $164_2$, $164_3$ and $164_N$ are respectively coupled with each of sensor assemblies $162_1$, $162_2$, $162_3$ and $162_N$ and with sensor interface 166. The ADCs (not shown) in each ADC assembly are coupled with the multiplexer (not shown) located thereto. Each of the ADCs in ADC assemblies $164_1$, $164_2$, $164_3$ and $164_N$ are therefore coupled with a respective single sensing coil in each of sensor assemblies $162_1$, $162_2$, $162_3$ and $162_N$ at a given moment in time by the use of the respective multiplexer in each ADC assembly. Sensor interface 166 is further coupled with tracking processor 150. It is noted that each of sensor assemblies $162_1$, $162_2$, $162_3$ and $162_N$ can be firmly attached to an object, thereby providing information relating to the position of that object.

Transmitter interface 152 produces a sequence of numbers. Transmitter interface 152 can also produce a digital representation of a signal. The sequence of numbers includes measurements of the current flowing in each transmission coil in transmitter assembly 158. These measurements are sampled at equal time intervals, at a sampling frequency which is at least two times higher than the highest transmitted frequency of transmitter assembly 158. A higher ratio between the sampling frequency and the highest transmitted frequency will produce measurements with less noise. The sequence of numbers is provided to DAC units $154_1$, $154_2$ and $154_3$, which each, in turn, converts it to a respective analog signal. Each of the analog signals is respective of a different spatial axis. In FIG. 2, DAC unit $154_1$ produces a signal for the x-axis, DAC unit $154_2$ produces a signal for the y-axis and DAC unit $154_3$ produces a signal for the z-axis. DAC units $154_1$, $154_2$ and $154_3$ provide their respective analog signals to amplifier 156, which amplifies the respective analog signals and provides the amplified signals to transmitter assembly 158.

Transmitter assembly 158 uses the amplified signals to generate respective amplified frequencies. Each transmitting coil, included in transmitter assembly 158, transmits a different amplified frequency for a different spatial axis. In practice, each transmitted amplified frequency, for each specific spatial axis, generally includes the transmitted frequencies for the other spatial axes, with the amplified frequency for that specific spatial axis being much stronger than the other frequencies. The other frequencies arise due to mutual inductance. In another embodiment of the disclosed technique, each transmitting coil, included in transmitter assembly 158, transmits a different amplified frequency combination for a different spatial axis. Each frequency combination may include a plurality of different frequencies. In general, more than six frequencies may be used by transmitter assembly 158, in order to achieve sufficient mathematical observability of the parameters of the EM field model (described in FIG. 4) and the sensing coil calibration parameters (described in FIG. 4), to accurately track an object. EM field 160 is the superposition of the individual EM fields generated by each transmission coil, each at different frequencies, in transmitter assembly 158.

Transmitter assembly 158 uses the generated respective amplified frequencies to provide a multiple axis EM field 160 to an area, which is defined by a detectable minimum EM field strength of EM field 160 and the boundaries of the physical space a tracked object can move about in. This virtually confined area is known in the art, in general, as a motion box. A magnetic motion box is defined as the volume in which the sensing coils of an EM tracker can detect the presence of an EM field. A physical motion box is defined as the boundaries of the physical space a tracked object can move about in. In general, in EM trackers, the volume defined by the physical motion box is included in the volume defined by the magnetic motion box. Therefore motion boxes mentioned herein refer to physical motion boxes unless otherwise stated. For example, a motion box can be located within the cockpit of a fighter jet, the inside of a tank, or the room in which a user using a 3D virtual reality console is located in. The EM field generated by transmitter assembly 158 is unique in the sense that each point in the motion box has unique measurable quantities, for example the magnetic field strength, as a vector quantity, of each point. Typically, transmitter assembly 158 provides frequencies on the order of tens of kilohertz.

EM field 160 causes a voltage difference in the sensing coils (not shown) of sensor assemblies $162_1$, $162_2$, $162_3$ and $162_N$, a phenomenon known as EM induction. The voltage difference is measured by each of sensor assemblies $162_1$, $162_2$, $162_3$ and $162_N$. The measuring of the voltage differences is synchronized with the measurements of the current flowing in each transmission coil in transmitter assembly 158. The voltage difference allows each of sensor assemblies $162_1$, $162_2$, $162_3$ and $162_N$ to correspondingly estimate the respective magnetic flux of EM field 160 passing through each of its respective sensing coils. Sensor assemblies $162_1$, $162_2$, $162_3$ and $162_N$ thereby indirectly measure the magnetic flux of EM field 160 passing through each of its respective sensing coils. This indirect measurement is herein referred to as a measurement. Each of sensor assemblies $162_1$, $162_2$, $162_3$ and $162_N$ produces a respective electrical analog signal corresponding to the magnetic flux measured by the respective sensing coils in that sensor assembly and provides it to the respective ADC assemblies $164_1$, $164_2$, $164_3$, and $164_N$ coupled therewith. Each of the ADCs in ADC assemblies $164_1$, $164_2$, $164_3$, and $164_N$ digitizes the analog signal fed thereto, converts it to a sequence of numbers and provides it to sensor interface 166, which in turn provides it to tracking processor 150.

Tracking processor 150 analyzes the received sequences of numbers, thereby estimating the position of each of the sensing coils of sensor assemblies $162_1$, $162_2$, $162_3$ and $162_N$, and providing the position data to a user. Accordingly, the analysis of tracking processor 150, in estimating the position of a tracked object, consists of estimating the position in the motion box corresponding to a particular magnetic flux measurement of the sensing coils of sensor assemblies $162_1$, $162_2$, $162_3$ and $162_N$. The magnetic flux measurement of each of the sensing coils is related to the position of that sensing coil according to a mathematical model of the EM field generated by transmitter assembly 158. Theoretically, if the number of transmission frequencies is at least six, with each frequency corresponding to a unique spatial distribution and orientation of EM field 160 and if the model of the EM field is fully determined, then system 140 can use a single sensor assembly, which includes a single sensing coil, to determine the position of a tracked object.

As a tracked object (not shown) moves around the motion box in which EM field 160 is provided, sensor assemblies $162_1$, $162_2$, $162_3$ and $162_N$ continuously measure the magnetic flux of EM field 160. Tracking processor 150 uses the updated magnetic flux measurements of sensor assemblies $162_1$, $162_2$, $162_3$ and $162_N$ to continuously update a user of the position of the tracked object (not shown). Tracking processor 150 continuously uses the updated magnetic flux measurements of sensor assemblies $162_1$, $162_2$, $162_3$ and $162_N$ to adaptively calibrate the sensing coils, within each of those sensor assemblies, with respect to one another. Tracking processor 150 also continuously uses the updated magnetic flux measurements of sensor assemblies $162_1$, $162_2$, $162_3$ and $162_N$ to adaptively improve the accuracy to which system 140 can estimate the position of the tracked object. The accuracy of system 140 is improved by modifying the mathematical models, used to describe the EM field, generated by transmitter assembly 158, and the measurements estimated by the sensing coils of sensor assemblies $162_1$, $162_2$, $162_3$ and $162_N$, as shall be described further below.

Figure 3:
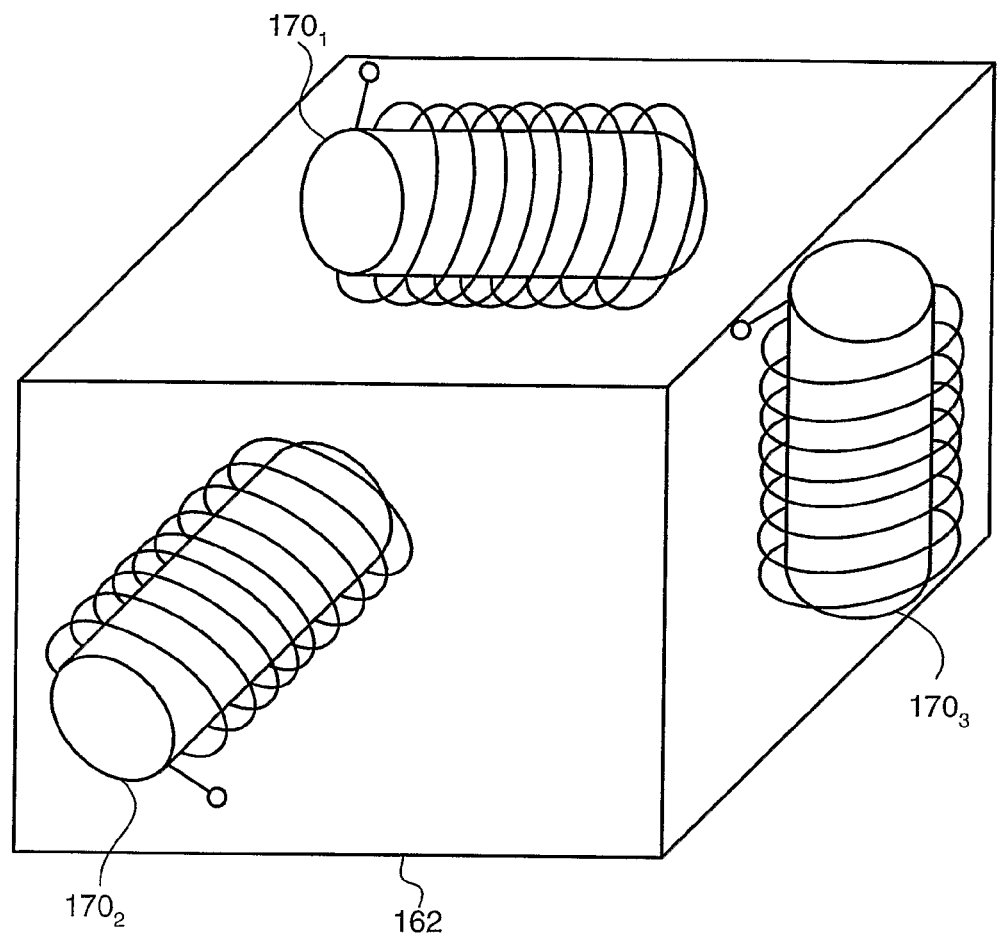
FIG. 3 is a detailed schematic illustration of the sensor assembly of FIG. 2.

Reference is now made to FIG. 3, which is a detailed schematic illustration of sensor assemblies $162_1$, $162_2$, $162_3$ and $162_N$ (FIG. 2). A sensor assembly 162 includes a plurality of sensing coils $170_1$, $170_2$ and $170_3$. Each of sensing coils $170_1$, $170_2$ and $170_3$ measures the voltage difference thereto, thereby indirectly measuring the quantity of magnetic flux passing there through. Each sensing coil indirectly measures the magnetic flux passing through it for a respective axis in a coordinate system, for example sensing coil $170_1$ measures the magnetic flux passing through it for the x-axis, sensing coil $170_2$ measures the magnetic flux passing through it for the y-axis and sensing coil $170_3$ measures the magnetic flux passing through it for the z-axis. Sensing coils $170_1$, $170_2$ and $170_3$ are not necessarily orientated, with respect to one another, in an orthogonal manner. It is noted that a sensor assembly, according to the disclosed technique, can include more than three sensing coils, which may increase the accuracy and enhance the performance of system 140.

Figure 4:
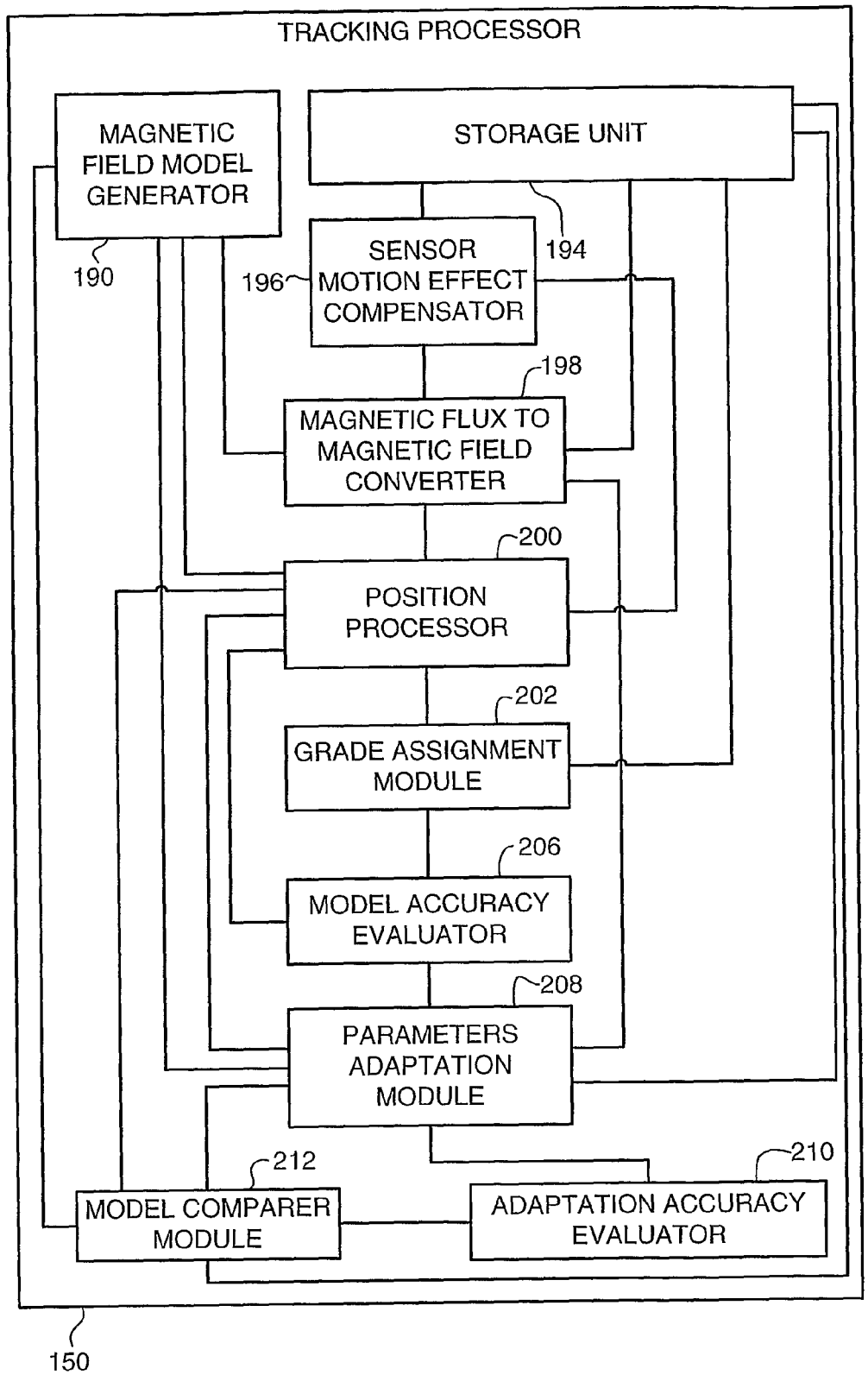
FIG. 4 is a detailed schematic illustration of the tracking processor of FIG. 2.

Reference is now made to FIG. 4, which is a detailed schematic illustration of tracking processor 150 (FIG. 2). Tracking processor 150 includes a magnetic field model generator 190, a storage unit 194, a sensor motion effect compensator 196, a magnetic flux to magnetic field converter 198, a position processor 200, a grade assignment module 202, a model accuracy evaluator 206, a parameters adaptation module 208, an adaptation accuracy evaluator 210, and a model comparer module 212.

Storage unit 194 is coupled with sensor motion effect compensator 196. Magnetic field model generator 190 is coupled with magnetic flux to magnetic field converter 198. Sensor motion effect compensator 196 is coupled with magnetic flux to magnetic field converter 198. Storage unit 194 is further coupled with magnetic flux to magnetic field converter 198. Sensor motion effect compensator 196 is further coupled with position processor 200. Magnetic flux to magnetic field converter 198 is further coupled with position processor 200. Position processor 200 is coupled with grade assignment module 202. Position processor 200 is further coupled with magnetic field model generator 190. Grade assignment module 202 is coupled with storage unit 194. Grade assignment module 202 is further coupled with model accuracy evaluator 206. Model accuracy evaluator 206 is coupled with parameters adaptation module 208. Model accuracy evaluator 206 is further coupled with position processor 200. Parameters adaptation module 208 is coupled with adaptation accuracy evaluator 210. Parameters adaptation module 208 is further coupled with model comparer module 212, magnetic field model generator 190, storage unit 194, magnetic flux to magnetic field converter 198 and position processor 200. Adaptation accuracy evaluator 210 is coupled with model comparer module 212. Model comparer module 212 is coupled with magnetic field model generator 190. Model comparer module 212 is further coupled with storage unit 194 and position processor 200.

Magnetic field model generator 190 generates and stores thereto, an approximated mathematical model of the EM field generated by transmitter assembly 158 (FIG. 2), herein referred to as the model. When system 140 (FIG. 2) initially starts tracking, the approximated model does not fully describe the EM field generated by transmitter assembly 158. The accuracy, at that point in time, to which system 140 can track an object is therefore low. Initially, the model does not include all the variable and constant parameters needed to describe the EM field generated by transmitter assembly 158. For example, the effect of currents induced in metallic elements in the motion box of system 140 by EM field 160 (FIG. 2) may not be compensated for by the model when system 140 starts tracking. Therefore, the model stored by magnetic field model generator 190 is initially incomplete. As a tracked object moves about in the motion box, the model is built up until it is complete and the accuracy to which system 140 can track an object is high.

The model generated by magnetic field model generator 190 may include either a harmonic expansion function, for example a spherical function describing the EM field, or an analytic relation describing the EM field, for example a relation based on the Biot-Savart Law, or a combination of the two. The model includes at least one set of parameters describing EM field 160, where each element of each set of parameters is a vector of real numbers. Parameters describing EM field 160 can include the coordinate relationships between transmitter assembly 158, EM field 160 and the sensing coils of each of sensor assemblies $162_1$, $162_2$, $162_3$ and $162_N$ (FIG. 2), as well as expansion centers and expansion coefficients of the model generated by magnetic field model generator 190. The set of parameters is mathematically designated by $\theta_{pm}$, where p=1,2, . . . , S, and m=1,2, . . . , $N_f$. The first index, p, enumerates the sets of parameters, from the first set (1) to the last set (S). The second index m, enumerates the transmission frequencies of transmitter assembly 158, from the first frequency used (1) to the last frequency used ($N_f$). $N_f$ is the total number of frequencies used by transmitter assembly 158. Magnetic field model generator 190 needs to be provided with only the number of frequencies provided by transmitter assembly 158 and not the number of transmission coils included in transmitter assembly 158. The model is constructed by defining a reference frame, herein referred to as the model reference frame, in the motion box of system 140 defined by EM field 160. The model reference frame locally establishes a coordinate system for relating the position of a tracked object in the motion box to a user. The model reference frame is a fixed reference frame.

The model substantially includes a matrix function, designated $\Phi$, for estimating the EM field amplitudes of EM field 160 from a fixed observation point within each sensing coil of each of sensor assemblies $162_1$, $162_2$, $162_3$ and $162_N$, at each transmission frequency of transmitter assembly 158. The fixed observation point can be the magnetic center within each sensing coil of each of the sensor assemblies. The magnetic center is defined as the center of mass of the inner volume of each sensing coil. EM field 160 can be completely characterized by the EM field amplitude at a particular transmission frequency at a particular point, because the amplitude, for a particular transmission frequency, is unique for each point in the EM field in the motion box.

The amplitude of the EM field is designated by the vector $\vec{B}_{mk}$, where $\vec{B}_{mk}=[B_{mk}^x, B_{mk}^y, B_{mk}^z]$. The first index, m, enumerates the transmission frequencies of transmitter assembly 158, from the first frequency used to the last frequency used. The second index, k, enumerates the sensing coils in all of sensor assemblies $162_1$, $162_2$, $162_3$ and $162_N$. The index k ranges from 1 to $N_c$, where $N_c$ is the combined total number of sensing coils in all the sensor assemblies. $B_{mk}^x$, $B_{mk}^y$ and $B_{mk}^z$, are respectively, the x-component, y-component and z-component of the EM field amplitude of the $m^{th}$ transmission frequency in the $k^{th}$ sensing coil. The model provides an analytical expression for the unique EM field amplitude at each particular frequency at the magnetic center of each sensing coil in a coordinate system relative to the sensor assemblies. This coordinate system moves as the sensor assemblies move, and is herein referred to as the sensor reference frame. The sensor reference frame can be related to the model reference frame by designating a vector, $\vec{r}$, as the location of the origin of the sensor reference frame relative to the model reference frame, a rotation matrix, R, as the orientation of the sensor reference frame relative to the model reference frame and vectors $\vec{r}_1, \ldots, \vec{r}_{N_c}$ as the radius vectors from the origin of the sensor reference frame to the magnetic center of each sensing coil.

Overall, EM field 160 can be defined as a matrix quantity $\hat{B}$, where $$\hat{B} = \begin{bmatrix} \vec{B}_{m1} \\ \vdots \\ \vec{B}_{mN_c} \end{bmatrix} \quad (2)$$

and $\vec{B}_{m1}, \ldots, \vec{B}_{mN_c}$, are the vector amplitudes of EM field 160 estimated in all the sensing coils, for all the transmission frequencies provided by transmitter assembly 158. Therefore, the matrix quantity $\hat{B}$ is a function of the model parameters $\sigma_{pm}$, the position of the sensor reference frame relative to the model reference frame and the radius vectors from the origin of the sensor reference frame to the center of each sensing coil magnetic center. This function can be written as $$\hat{B} = \Phi(\theta_{11}, \ldots, \theta_{SN_f}, P, O, \vec{r}_1, \ldots \vec{r}_{N_c}) \quad (3)$$

where $\theta_{11}, \ldots, \theta SN_f$ are all the parameter sets of all the frequencies provided by transmitter assembly 158, P is defined as $\vec{r}$, O is defined as R and all other quantities are as they were defined above. Matrix function $\Phi$ may be either a linear or non-linear function with respect to the model parameters $\theta_{pm}$. For example, when EM field 160 is represented in the form of a harmonic expansion function, the EM field amplitude of the $m^{th}$ transmission frequency at the magnetic center of the $k^{th}$ sensing coil can be written as $$\vec{B}_{mk}(\vec{r}+\vec{r}_k) = R \cdot \begin{bmatrix} h_{x,1}(\vec{r}+\vec{r}_k) & \cdots & h_{x,S}(\vec{r}+\vec{r}_k) \\ \vdots & h_{i,j}(\vec{r}+\vec{r}_k) & \vdots \\ h_{z,1}(\vec{r}+\vec{r}_k) & \cdots & h_{z,S}(\vec{r}+\vec{r}_k) \end{bmatrix} \cdot \begin{bmatrix} \theta_{1m} \\ \theta_{2m} \\ \vdots \\ \theta_{Sm} \end{bmatrix} \quad (4)$$

where $\vec{B}_{mk}(\vec{r}+\vec{r}_k)$ represents the vector amplitude of EM field 160 estimated at the $m^{th}$ transmission frequency at the magnetic center of the $k^{th}$ sensing coil, $h_{i,j}(\vec{r}+\vec{r}_k)$ is a set of harmonic vector functions, where the index i represents the field component, with i=x,y,z, the index j represents the order of the harmonic expansion function, with j=1, . . . , S, where the boundaries of j, namely 1, . . . , S, correspond to the boundaries of the first index on $\theta$, and all other quantities are as they were defined above. In this example, according to Equations (2) and (3), the matrix function $\Phi$ includes the EM field amplitudes $\vec{B}_{mk}(\vec{r}+\vec{r}_k)$ estimated for each transmission frequency in each sensing coil by Equation (4). In this example, when matrix function $\Phi$ is chosen as a linear expansion, in terms of a harmonic function, each set of model parameters $\theta_{pm}$, in Equation (4), estimates an independent contribution to $\hat{B}$ at each transmission frequency, m, of transmitter assembly 158. In an embodiment of the disclosed technique, the model has an efficient analytical or numerical method, for determining the mathematical gradients of the EM field model.

Storage unit 194 stores a set of calibration parameters of sensor assemblies $162_1$, $162_2$, $162_3$ and $162_N$. Calibration parameters include the orientation of the sensing coils of each sensor assembly with respect to the sensor reference frame in system 140, the set of radius vectors $\vec{r}_k$, from the origin of the sensor reference frame of system 140 to the magnetic center of each sensing coil, the gain in each sensor assembly, the parameters defining the amplifiers in each sensor assembly, other parameters relating to the electronic components of the sensor assemblies, other sensing coil calibration data, and the respective error to which each of these quantities is known. When system 140 commences tracking an object, the relative rotation angles of the sensing coils with respect to one another, are known with an error of several degrees. The relative rotation angles and their respective errors are stored in storage unit 194. In addition, internal calibration parameters of the sensing coils, are known with an error of a few percent, and stored in storage unit 194.

Storage unit 194 also stores a Taylor series expansion function for each coordinate component (x,y,z) of the EM field amplitude of EM field 160 as a function of the vector location of a point, q, in EM field 160, designated by the vector $\vec{r}$. $\vec{r}$ is a vector measured from the origin of the sensor reference frame to point q. The coordinate components of the EM field amplitude at a vector point $\vec{r}$ within a sensing coil, in the vicinity of $\vec{r}_k$, the radius vector from the origin of the sensor reference frame to the magnetic center of the $k^{th}$ sensing coil (as is known in the art), can be expanded as:

$$B_{mk}^x(\vec{r}) = B_{mk}^x(\vec{r}_k) + \sum_{\alpha \in \{x,y,z\}} \frac{\partial B_{mk}^x(\vec{r}_k)}{\partial r^\alpha}(r^\alpha - r_k^\alpha) + \quad (5)$$

$$\frac{1}{2} \sum_{\alpha,\beta \in \{x,y,z\}} \frac{\partial^2 B_{mk}^x(\vec{r}_k)}{\partial r_k^\alpha r_k^\beta}(r^\alpha - r_k^\alpha)(r^\beta - r_k^\beta) + \ldots$$

$$B_{mk}^y(\vec{r}) = B_{mk}^y(\vec{r}_k) + \sum_{\alpha \in \{x,y,z\}} \frac{\partial B_{mk}^y(\vec{r}_k)}{\partial r^\alpha}(r^\alpha - r_k^\alpha) + \quad (6)$$

$$\frac{1}{2} \sum_{\alpha,\beta \in \{x,y,z\}} \frac{\partial^2 B_{mk}^y(\vec{r}_k)}{\partial r_k^\alpha r_k^\beta}(r^\alpha - r_k^\alpha)(r^\beta - r_k^\beta) + \ldots$$

$$B_{mk}^z(\vec{r}) = B_{mk}^z(\vec{r}_k) + \sum_{\alpha \in \{x,y,z\}} \frac{\partial B_{mk}^z(\vec{r}_k)}{\partial r^\alpha}(r^\alpha - r_k^\alpha) + \quad (7)$$

$$\frac{1}{2} \sum_{\alpha,\beta \in \{x,y,z\}} \frac{\partial^2 B_{mk}^z(\vec{r}_k)}{\partial r_k^\alpha r_k^\beta}(r^\alpha - r_k^\alpha)(r^\beta - r_k^\beta) + \ldots$$

where m=1,2, . . . , $N_f$, k=1,2, . . . , $N_c$, and $B_{mk}^x(\vec{r})$, $B_{mk}^y(\vec{r})$ and $B_{mk}^z(\vec{r})$, are respectively, the x-component, y-component and z-component of the EM field amplitude of the $m^{th}$ transmission frequency in the $k^{th}$ sensing coil as a function of radius vector $\vec{r}_k$ to observation vector point $\vec{r}$. The index m, enumerates the transmission frequencies of transmitter assembly 158, from the first frequency used 1 to the last frequency used $N_f$. The index k, enumerates the sensing coils in sensor assemblies $162_1$, $162_2$, $162_3$ and $162_N$. All other terms are as they were defined above.

Storage unit 194 also stores the magnetic flux estimated by the measurements of the sensing coils. The stored magnetic flux measurements are used by storage unit 194 to estimate the amplitude and phase of the magnetic flux estimated by the sensing coils. Typically, the signal measured by a steady state sensing coil is expected to follow a mathematical model, where the signal measured is defined mathematically as a periodic function of time $$F(t) = \sum_{m=1}^{N_f} F_m \cos(2\pi f_m t + p_m) \quad (8)$$

where F(t) is the magnetic flux at time instant t, $F_m$ is the amplitude of the magnetic flux at transmission frequency number m ($f_m$) and $p_m$ is the phase of the magnetic flux at $f_m$. The definition of Equation (8) is stored in storage unit 194.

In order to estimate the values of parameters $F_m$ and $p_m$ in Equation (8), such that F(t) in Equation (8) substantially describes the magnetic flux measurements measured by the sensing coils, multiple measurements of the magnetic flux in a time period T are executed at a known frequency, $f_m$. The measurements are fit to Equation (8) in sensor motion effect compensator 196, using mathematical fitting techniques known in the art, from which an estimated value for $F_m$ and $p_m$ can be obtained. Time period T is commonly referred to in the art as a sampling window. Estimating $F_m$ and $p_m$ using multiple measurements in a sampling window is accurate in the case that the sensing coils located inside each sensor assembly are stationary.

In system 140, the tracked object, onto which the sensing coils are attached, may be moving. This movement may occur during a sampling window and introduces an error in the amplitude and phase approximation of the magnetic flux as a function of time. This error is due to the translation and rotational velocity of the sensing coils in each of the respective sensor assemblies, and is manifest in the form of a non-periodic variation of magnetic flux as a function of time.

Sensor motion effect compensator 196 compensates the effect of the translational and rotational velocity of the sensing coils, on the estimated magnetic flux amplitudes and phases. Sensor motion effect compensator 196 executes the compensation by continuously generating a mathematical sensing model (herein referred to as the sensing model) of each measurement estimated by the sensing coils. The sensing model defines $F_m$ and $p_m$ as time functions rather than as constant parameters. $F_m$ and $p_m$ are defined, in general, in sensor motion effect compensator 196, as Taylor series expansion functions of $\Delta t_n$, where $\Delta t_n$ is an amount of time within the $n^{th}$ sampling window measured from the center of the sampling window. The Taylor series expansion functions of $F_m$ and $p_m$ can be expressed mathematically as $$F_m(\Delta t_n) = F_m + F_m' \Delta t_n + F_m'' \Delta t_n^2 + F_m''' \Delta t_n^3 + \quad (9)$$

and $$p_m(\Delta t_n) = p_m + p_m' \Delta t_n + p_m'' \Delta t_n^2 + p_m''' \Delta t_n^3 + \quad (10)$$

where $F_m'$ and $p_m'$, $F_m''$ and $p_m''$, and $F_m'''$ and $p_m'''$ are respectively the first, second and third derivatives of $F_m$ and $p_m$. The number of a derivative (first, second, third, etc. . . . ) is also referred to as the order, with the zero order term referring to the term with no derivatives, for example $F_m$ and $p_m$.

The expansion parameters of Equations (9) and (10), namely $F_m, F_m', F_m'', \ldots$, and $p_m, p_m', p_m'', \ldots$, are estimated anew, by sensor motion effect compensator 196, each time a magnetic flux measurement is stored in storage unit 194. The expansion parameters of Equations (9) and (10) are estimated by minimizing the deviation between the magnetic flux estimated by the measurements of the sensing coils, and the magnetic flux, F(t), estimated by Equation (8) in sensor motion effect compensator 196, using the estimated magnetic flux amplitude and phase. The minimization calculation (herein referred to as minimization) is achieved by using a least mean square cost function, as is known in the art. In general, the number of expansion parameters needed, in Equations (9) and (10), to compensate the effect of the translational and rotational velocity of the sensing coils, is known. In an embodiment of the disclosed technique, if the number of expansion parameters needed is not known, then when system 140 starts tracking an object, the minimization is used to estimate the zero order terms, $F_m$ and $p_m$, for each transmission frequency of transmitter assembly 158 in each sensing coil. As system 140 tracks an object, minimizations are repeatedly executed to estimate the higher order derivative terms until the number of terms retained in Equations (9) and (10) (i.e. the sensing model equations) are sufficient to compensate for the translational and rotational velocity of the sensing coils.

Equations (9) and (10) can be truncated by retaining the terms up to the zero, first, second or any other higher order. In the case that only the zero order terms are retained, $F_m$ and $p_m$, Equations (9) and (10) define $F_m$ and $p_m$ in Equation (8) as constant parameters. Equation (8) therefore approximates the magnetic flux measured by the sensing coils, as measured by steady state sensing coils. The number of terms sensor motion effect compensator 196 retains and uses from Equations (9) and (10) to compensate for the effect of moving sensing coils depends on various factors. The factors may either include the width of the sampling window, the typical velocity and acceleration of the tracked object, the mathematical EM field gradients of the model, or a combination of the above. The highest order term retained by sensor motion effect compensator 196 can either be chosen a priori based on the above factors, and stored thereto, or it can be treated as an adjustable parameter thereto, based on the normalized residual error between the EM field amplitudes estimated by magnetic flux to magnetic field converter 198 and magnetic field model generator 190. The normalized residual error is estimated by position processor 200, the result of which can be used to decide on the highest order term Equations (9) and (10) retain in sensor motion effect compensator 196. For example, a residual error of two to three σ (i.e. two to three standard deviations) may indicate that the highest order term retained in Equations (9) and (10) is increased by one.

Magnetic flux to magnetic field converter 198 transforms the compensated matrix of magnetic fluxes (for each transmission frequency of transmitter assembly 158 and for each sensing coil) estimated by sensor motion effect compensator 196, into a corresponding matrix of EM field amplitudes at the magnetic center of each sensing coil, for each transmission frequency of transmitter assembly 158. The transformation is executed using the sensing coil calibration parameters stored in storage unit 194, including Equations (5), (6) and (7), and the EM field model generated by magnetic field model generator 190. The magnetic flux matrix estimated by sensor motion effect compensator 196 is transformed into an EM field amplitude matrix by $$F_{mk} = \sum_{\alpha \in \{x,y,z\}} c_{mk0}^{\alpha} B_{mk}^{\alpha}(\vec{r_k}) + \quad (11)$$

-continued $$\sum_{\alpha,\beta \in \{x,y,z\}} c_{mk1}^{\alpha,\beta} \frac{\partial B_{mk}^{\alpha}(\vec{r_k})}{\partial r^{\beta}} + \sum_{\alpha,\beta,\gamma \in \{x,y,z\}} c_{mk2}^{\alpha,\beta,\gamma} \frac{\partial B_{mk}^{\alpha}(\vec{r_k})}{\partial r^{\beta} \partial r^{\gamma}} + \ldots$$

where $F_{mk}$ is the zero order term of Equation (9), indicating the measured and compensated magnetic flux at transmission frequency m in sensing coil k, estimated by sensor motion effect compensator 196. $c_{mk0}^{\alpha}$, $c_{mk1}^{\alpha,\beta}$, $c_{mk2}^{\alpha,\beta,\gamma}$ are tensor coefficients that result from the term by term integration of Equations (5), (6) and (7) for the EM field model, over the surface area bounded by each sensing coil winding, summing over all the windings of each sensing coil. The third index on tensor coefficients $c_{mk0}^{\alpha}$, $c_{mk1}^{\alpha,\beta}$, $c_{mk2}^{\alpha,\beta,\gamma}$, namely, 0,1,2, labels the integrated gradient order term from Equations (5), (6) and (7). Therefore, $c_{mk0}^{\alpha}$ is the tensor coefficient resulting from integrating the zero order gradient term from Equations (5), (6) and (7), $c_{mk1}^{\alpha,\beta}$ is the tensor coefficient resulting from integrating the first order gradient term from Equations (5), (6) and (7), and $c_{mk2}^{\alpha,\beta,\gamma}$ is the tensor coefficient resulting from integrating the second order gradient term from Equations (5), (6) and (7). All other terms and quantities are as they were defined above.

Tensor coefficients $c_{mk0}^{\alpha}$, $c_{mk1}^{\alpha,\beta}$, $c_{mk2}^{\alpha,\beta,\gamma}$ relate the measured magnetic flux to the EM field model and the mathematical gradients of the EM field model. Tensor coefficients $c_{mk0}^{\alpha}$, $c_{mk1}^{\alpha,\beta}$, $c_{mk2}^{\alpha,\beta,\gamma}$ are stored in magnetic flux to magnetic field converter 198 as sensing coil parameters and are modified and refined adaptively as a tracked object is tracked in time. Magnetic flux to magnetic field converter 198 solves for $B_{mk}^{\alpha}(\vec{r_k})$, the first term on the right hand side of Equation (11), using techniques known in the art. The other terms of Equation (11) are estimated by magnetic flux to magnetic field converter 198 or position processor 200, as described below.

Equation (11) can be truncated by retaining the terms up to the zero, first, second or any other higher order of mathematical gradient. In the case that only the zero order term is retained, indicating that all the mathematical field gradient terms are discarded, Equation (11) is equivalent to the assumption that the EM field within each sensing coil can be approximated as a uniform field. The highest order term magnetic flux to magnetic field converter 198 retains and uses from Equation (11) to convert the magnetic flux to a measure of the amplitude of EM field 160 depends on various factors. The factors may either include an estimation of the EM field model mathematical gradients, the approximate size of the sensing coils, or a combination of the above. The highest order term retained by magnetic flux to magnetic field converter 198 can either be chosen a priori based on the above factors, or it can be treated as an adjustable parameter based on the normalized residual error between the EM field amplitudes estimated by magnetic flux to magnetic field converter 198 and magnetic field model generator 190. The normalized residual error is determined by position processor 200, the result of which can be used to determine the highest order of terms in Equation (11) retained by magnetic flux to magnetic field converter 198. For example, a residual error of one σ (i.e. one standard deviation) may indicate that the highest order of terms retained in Equation (11) is increased by one. The highest order of terms retained in Equation (11) is adaptively refined as system 140 tracks an object, until a sufficient accuracy in estimating the position of the object is achieved.

The magnetic flux matrix estimated by sensor motion effect compensator 196 can be transformed into a matrix of EM field amplitudes by expanding $B_{mk}^{x}(\vec{r})$, $B_{mk}^{y}(\vec{r})$, $B_{mk}^{z}(\vec{r})$, $F_m(\Delta t_n)$ and $p_m(\Delta t_n)$ in terms of spherical functions, or other basic harmonic functions. In the case that spherical functions are used, the mathematical representation of the measured magnetic flux (for example, Equation (8)) will be a linear function of the expansion coefficients of the spherical expansion function. The parameters involved in the definition of this linear function represent the geometry of the sensing coils. Therefore, these parameters are analogous to tensor coefficients $c_{mk0}^{\alpha}$, $c_{mk1}^{\alpha,\beta}$, $c_{mk2}^{\alpha,\beta,\gamma}$, of Equation (11). In general, any mathematical model relating the EM field amplitudes measured within a sensing coil to the measured magnetic flux in a sensing coil, can be used in place of Equation (11) in magnetic flux to magnetic field converter 198. For consistency, the Taylor series expansions of $B_{mk}^{x}(\vec{r})$, $B_{mk}^{y}(\vec{r})$, $B_{mk}^{z}(\vec{r})$, $F_m(\Delta t_n)$, $p_m(\Delta t_n)$ and $F_{mk}$ (Equations (5), (6), (7), (9), (10) and (11)) are used throughout the rest of the description of the disclosed technique.

Position processor 200 estimates the position of each sensing coil, based on the unique EM field amplitude components $B_{mk}^{x}(\vec{r})$, $B_{mk}^{y}(\vec{r})$ and $B_{mk}^{z}(\vec{r})$ estimated by magnetic field model generator 190 and magnetic flux to magnetic field converter 198. In one embodiment of the disclosed technique, magnetic flux to magnetic field converter 198 estimates the EM field amplitude components by solving for all the $B_{mk}^{\alpha}(\vec{r_k})$ terms in Equation (11). In a second embodiment of the disclosed technique, magnetic flux to magnetic field converter 198 estimates the EM field amplitude components iteratively with position processor 200 by solving for all the $B_{mk}^{\alpha}(\vec{r_k})$ terms in Equation (11). In a third embodiment of the disclosed technique, position processor 200 estimates the EM field amplitude components by solving for all the $B_{mk}^{60}(\vec{r_k})$ terms in Equation (11).

The first term, on the right hand side, of Equation (11), represents a simple linear relation between the measured magnetic flux in the sensing coils, and the EM field amplitude components $B_{mk}^{x}$, $B_{mk}^{y}$, and $B_{mk}^{z}$, in the case that the sensing coils are considered as point-like sensing coils. Since the sensing coils are not considered as point-like sensing coils in the disclosed technique, the gradient terms of Equation (11), for example $$\frac{\partial B_{mk}^{\alpha}(\vec{r_k})}{\partial r^{\beta}} \text{ and } \frac{\partial^2 B_{mk}^{\alpha}(\vec{r_k})}{\partial r^{\beta} \partial r^{\gamma}},$$

and their respective terms, represent a correction for this simple linear relation. There is a difficulty in estimating the gradient terms of Equation (11), because the position of the sensing coils has not yet been estimated by position processor 200. In fact, it is these gradients terms that are needed in order to accurately estimate the position of each sensing coil.

In one embodiment of the disclosed technique, an extrapolation technique is used in magnetic flux to magnetic field converter 198, to estimate the position of the sensing coils, which can be used to estimate the gradient terms of Equation (11). The estimated gradients terms allow tracking processor 150 to more accurately estimate the position of the sensing coils. In this technique, the estimated position of the sensing coils is calculated based on the previous position of the sensing coils. The previous position of the sensing coils is obtained from the center of the previous sampling window to the center of the current sampling window. The estimated position of the sensing coils is extrapolated from the center of the current sampling window to the center of the next sampling window. Using the sensing model and its corresponding equations (Equations (8), (9) and (10)), all measurements of the position of the sensing coils, at a particular time, are related to the center of the current respective sampling window. The extrapolation can be based on the following assumptions, for example, a fixed translational and rotational velocity of the sensing coils in one sampling window, or a fixed translational and rotational velocity of the sensing coils within a time duration between the center of two successive sampling windows. The extrapolated position of the sensing coils is used as the location where the gradients terms of Equation (11) are estimated.

In a second embodiment of the disclosed technique, an iterative technique, using the principles of perturbation theory, is used with magnetic flux to magnetic field converter 198 and position processor 200, to estimate the position of the sensing coils. In this technique, the EM field amplitude components are first estimated in magnetic flux to magnetic field converter 198, based on a simplified sensing coil model of point-like sensing coils. This is equivalent to magnetic flux to magnetic field converter 198 using Equation (11) with only the first term of the right hand side. Position processor 200 then uses the estimated EM field amplitude components to approximate the position of each sensing coil. The position of each sensing coil is then used by magnetic flux to magnetic field converter 198 to estimate the gradient terms of Equation (11). The estimated gradients terms can then be used again by magnetic flux to magnetic field converter 198 to estimate the EM field amplitude components. The EM field amplitude components can then be used again by position processor 200 to approximate the position of each sensing coil. The position of each sensing coil can then be used again by magnetic flux to magnetic field converter 198 to estimate the gradient terms of Equation (11). This technique is repeated, in an iterative manner, using the principles of perturbation theory, until a sufficient accuracy, in estimating both the position of the sensing coils and the EM field amplitude components, is achieved.

In a third embodiment of the disclosed technique, the EM field amplitude components as well as the position of the sensing coils are estimated simultaneously by position processor 200. The position of the sensing coils is estimated by minimizing the deviation between the EM field amplitude components estimated by magnetic field model generator 190, and the EM field amplitude components estimated by magnetic flux to magnetic field converter 198. The minimization adapts the parameters in the EM field model to better fit the EM field estimated by magnetic flux to magnetic field converter 198. Using these adapted parameters, position processor 200 uses the EM field model stored in magnetic field model generator 190 to estimate the position of the sensing coils. The deviation is minimized by $$\arg\min_{P,O} \|\hat{B} - \Phi(\theta_{11}, \ldots, \theta_{SN_f}, P, O, \vec{r}_1, \ldots, \vec{r}_{N_c})\| \quad (12)$$

where $\hat{B}$ (the EM field model defined by Equation (2)) contains the vector amplitudes of EM field 160 estimated in all the sensing coils using Equation (11), and $\Phi$ (the EM field model defined by Equation (3)) is the mathematical model of EM field 160 estimated by magnetic field model generator 190. In this embodiment of the disclosed technique, each element of $\hat{B}$ (indicating each component of $\hat{B}$, such as $\vec{B}_{m1}{}^x$, $\vec{B}_{m1}{}^y$ and $\vec{B}_{m1}{}^z$) is treated as a minimized parameter. Furthermore, the parameters defining the sensing coils and the EM field model are assumed to be fixed constants.

The EM field amplitude components, indicating the $B_{mk}{}^\alpha(\vec{r}_k)$ terms of Equation (11), are estimated by minimizing the deviation between the flux estimated by sensor motion effect compensator 196 and the flux calculated from the EM field model. Position processor 200 calculates the flux from the EM field model by replacing B in Equation (11) with $\hat{B}$, the EM field model of Equation (2). The deviation is minimized by $$\arg\min_{\substack{P,O \\ B_{mk}^\alpha}} \left\| F_{mk} - \sum_{\alpha=1}^{3} c_{mk0}^\alpha \hat{B}_{mk}^\alpha(\vec{r}_k) - \sum_{\alpha,\beta=1}^{3} c_{mk1}^{\alpha,\beta} \frac{\partial \hat{B}_{mk}^\alpha(\vec{r}_k)}{\partial r^\beta} - \sum_{\alpha,\beta,\gamma=1}^{3} c_{mk2}^{\alpha,\beta,\gamma} \frac{\partial \hat{B}_{mk}^\alpha(\vec{r}_k)}{\partial r^\beta \partial r^\gamma} - \ldots \right\| \quad (13)$$

where $F_{mk}$ is the flux estimated by sensor motion effect compensator 196. The summations in Equation (13) come from Equation (11) using $\hat{B}$ (the EM field model of Equation (2)). All other terms and quantities are as they were defined before. Equations (12) and (13) are solved by using a non-linear, least mean square optimization technique, for example, Newton's method, as is known in the art.

Position processor 200 also estimates the normalized residual error in the calculation of the position of the sensing coils. The error is a measurement of the minimized deviation of Equation (12). The normalized residual error is referred to as the figure of merit (herein abbreviated FOM) of a position calculation. The FOM is defined as $$FOM = \sqrt{\frac{1}{N_f N_c} \sum_{m=1}^{N_f} \sum_{k=1}^{N_c} \frac{\|B_{mk}^\alpha - \Phi_{mk}^\alpha(\theta_{11}, \ldots, \theta_{SN_f}, P^*, O^*, \vec{r}_1, \ldots, \vec{r}_{N_c})\|}{\|B_{mk}^\alpha\|^2}} \quad (14)$$

where $\alpha=x,y,z$, $\Phi_{mk}{}^\alpha$ represents the components of the matrix function, providing an EM field at the $m^{th}$ frequency, in the magnetic center of the $k^{th}$ sensing coil, and P* and O* are respectively the location and orientation of the tracked object estimated by Equation (12). All other terms and quantities are as they were defined before. The larger the FOM, the larger the error in the calculation of the position of the sensing coils. Position processor 200 provides the position of the tracked object, as well as the FOM of the current position calculation, to a user.

Grade assignment module 202 groups together $F_{mk}$, the measured and compensated magnetic flux in each sensing coil, and the position of each sensing coil calculated using Equation (12), into an element referred to as a point. Each point is assigned a grade, by grade assignment module 202. Depending on the grade, a point is either abandoned, or selected for storage. If a point is selected for storage, it is stored in storage unit 194. The grade is a positive parameter based on various factors. The factors may either include the FOM of the point, the geometrical location of the point in the motion box, the grades assigned to previous points stored in storage unit 194 or a combination of the above. The factors each have relative weights in determining the grade. For example, a large FOM of a current point, compared to the FOM of points stored in storage unit 194, is an aspect which increases the grade, because such points help tracking processor 150 improve the EM field model. In addition, if the geometrical location of the point in the motion box is far enough from all the points already stored in storage unit 194, it may also be a reason for increasing the grade of the current point.

Position measurements with large FOMs are indicative of locations in the motion box not yet explored by the tracked object. Since these new locations help tracking processor 150 improve and expand the EM field model, such measurements may receive high grades. The grades of points already stored in storage unit 194 may also be varied with time. For example, the grades of points already stored may gradually decrease over time, introducing a fading memory effect to points stored in storage unit 194.

A point is stored in storage unit 194 if its grade is above a certain minimum and there is still room in storage unit 194 to store more points. If storage unit 194 is full, and a point possesses a high enough grade for storage in storage unit 194, the point is stored by replacing a point in storage unit 194 with a lower grade. Storage unit 194 has a capacity to store a few hundred points, and in general, the size of storage unit 194 is determined by the number of unknowns that need to be estimated in Equation (3) to properly generate an accurate EM field model of the EM field in the motion box. Points with high enough grades are stored to assist parameters adaptation module 208 in refining the EM field model stored in magnetic field model generator 190. These points also assist parameters adaptation module 208 in calibrating the sensing coils, by refining the calibration parameters of the sensing coils stored in storage unit 194 and the sensing model stored in sensor motion effect compensator 196.

Model accuracy evaluator 206 determines the accuracy to which sensing coil calibration parameters are known, and the accuracy to which the EM field model estimated by magnetic field model generator 190 estimates the EM field amplitude components measured by the sensor assemblies. The determination of the accuracy is based on various factors. The factors may either include the FOM of the accumulated points, the accuracy of system 140 achieved so far, the desired accuracy of system 140 in a particular field of usage (for example military use or 3D gaming use), the mathematical observability of the parameters defining the EM field model and the sensing coil calibration parameters, or a combination of the above. Mathematical observability is essentially a measure of how well unknown parameters can be estimated from known parameters in a system. If the error in estimating the unknown parameters is too high, the unknown parameters are non-observable. Otherwise, the unknown parameters are observable.

If the determined accuracy is above the required level, model accuracy evaluator 206 directs position processor 200 to continue collecting points, estimating each of their positions, and each of their FOMs. The determined accuracy is generally above the required level when a majority of the points within a part of the motion box have been collected and have had grades assigned to them. If the determined accuracy is below the required level, model accuracy evaluator 206 directs parameters adaptation module 208 to adapt the parameters defining the EM field model, the sensing model and the calibration parameters of the sensing coils.

Parameters adaptation module 208 adapts and refines the parameters defining the EM field model, the sensing model and the calibration parameters of the sensing coils by executing two minimizations, either subsequently, or simultaneously. The first minimization is a minimization of the deviation between the EM field amplitude components estimated by magnetic field model generator 190 and the EM field amplitude components estimated by magnetic flux to magnetic field converter 198. The second minimization is a minimization of the deviation between the magnetic flux estimated by sensor motion effect compensator 196 and the magnetic flux estimated from the EM field model, using Equation (11), in position processor 200. These two minimizations are executed by solving $$\arg\min_{P,O,B^\alpha_{mk},\theta_{pm},c_{mk},\vec{r}_k} \|\hat{B} - \Phi(\theta_{11}, \ldots \theta_{SN_f}, P, O, \vec{r}_1, \ldots, \vec{r}_{N_c})\| \quad (15)$$

and $$\arg\min_{\substack{P,O,\\B^\alpha_{mk},\\ \theta_{pm},\\ c_{mk},\vec{r}_k}} \left\| F_{mk} - \sum_{\alpha=1}^{3} c^\alpha_{mk0} \hat{B}^\alpha_{mk}(\vec{r}_k) - \sum_{\alpha,\beta=1}^{3} c^{\alpha,\beta}_{mk1} \frac{\partial \hat{B}^\alpha_{mk}(r_k)}{\partial r^\beta} - \sum_{\alpha,\beta,\gamma=1}^{3} c^{\alpha,\beta,\gamma}_{mk2} \frac{\partial^2 \hat{B}^\alpha_{mk}(r_k)}{\partial r^\beta \partial r^\gamma} - \ldots \right\| \quad (16)$$

where all terms and quantities are as they were previously defined. In the case that a sensing coil is replaced, the parameters defined by θ will not be known immediately after the sensing coil is replaced. In order to perform the adaptation of those parameters, the following equations are minimized:

$$\arg\min_{P,O} \|\hat{B} - \Phi(\theta_{11}, \ldots \theta_{SN_f}, P, O, \vec{r}_1, \ldots, \vec{r}_{N_c})\| \quad (17)$$

and $$\arg\min_{\substack{P,O,\\B^\alpha_{mk},\\ \theta_{pm},\\ c_{mk},\vec{r}_k}} \left\| F_{mk} - \sum_{\alpha=1}^{3} c^\alpha_{mk0} \hat{B}^\alpha_{mk}(\vec{r}_k) - \sum_{\alpha,\beta=1}^{3} c^{\alpha,\beta}_{mk1} \frac{\partial \hat{B}^\alpha_{mk}(r_k)}{\partial r^\beta} - \sum_{\alpha,\beta,\gamma=1}^{3} c^{\alpha,\beta,\gamma}_{mk2} \frac{\partial^2 \hat{B}^\alpha_{mk}(r_k)}{\partial r^\beta \partial r^\gamma} - \ldots \right\| \quad (18)$$

where all terms and quantities are as they were previously defined. Parameters adaptation module 208 performs a minimization similar to the minimization performed by position processor 200. The difference in the minimizations is that parameters adaptation module 208 performs a minimization calculation involving all the points stored in storage unit 194, whereas position processor 200 performs a minimization involving only a single point.

Some of the parameters defining the EM field model and the calibration parameters of the sensor assemblies may be mathematically non-observable when parameters adaptation module 208 executes a minimization. This is typical when the tracked object is in a new environment, the FOM of accumulated points is high, storage unit 194 is not full of points, or an area in the physical motion box, with a low probability of being explored, for example, a corner of the physical motion box, has not yet been explored by the tracked object.

In the case of storage unit 194 not being full of points, a model simplification technique is used to execute the minimizations of Equations (15) and (16) (or Equations (17) and (18)). In the model simplification technique, non-observable parameters are either excluded from the EM field model and the minimization calculations, or they are considered as constants in the minimization calculations. Non-observable parameters can be selected using standard methods in estimation theory, for example, using Cramer-Rao bounds analysis, as is known in the art. The model simplification technique becomes a preferred technique to use when an entire set of EM field model parameters $\theta_{mk}$ are non-observable, indicating that the EM field model structure and the sensing model structure are not yet established. The EM field model structure is not yet established when the EM field model, describing EM field 160, cannot estimate the position of sensing coils, attached to a tracked object, to a high degree of accuracy. The sensing model structure is not yet established when the number of gradient terms in Equations (5), (6), (7) and (11), needed to properly estimate the position of the tracked object, has not yet been determined.

In the case that areas in the physical motion box, with a low probability of being explored, are being explored by the tracked object, a constraint technique is used to execute the minimization of Equations (15) and (16) (or Equations (17) and (18)). In the constraint technique, all parameters, including non-observable ones, are considered in the minimization calculations, except the minimization calculations are performed under specific constraints. One such constraint could be that the EM field amplitude components, estimated by the EM field model (generated by magnetic field model generator 190) before and after the minimization calculations, be close to one another within a defined tolerance level. The constraint technique becomes a preferred technique to use when the EM field model structure and the sensing model structure have been established. The EM field model structure is established when the EM field model, describing EM field 160, can estimate the position of sensing coils to a high degree of accuracy. The sensing model structure is established when the number of gradient terms in Equations (5), (6), (7) and (11), needed to properly estimate the position of the tracked object has been determined, but some parameters of those equations are non-observable.

The model simplification technique and the constraint technique allow tracking processor 150 to select the points with the highest grades to perform the minimization calculations. These techniques allow parameters adaptation module 208 to start minimizing with very few points stored in storage unit 194. The rapid onset of minimization calculations allow for an accelerated rate in minimizing parameters and a quick determination of an accurate EM field model and sensing model. The rapid onset of minimization calculations also allows for an accelerated rate in calibrating the sensing coils. The tracked object does not need to explore the entire motion box before an accurate EM field model and sensing model can be generated and the sensing coils calibrated. The disclosed technique allows the EM field model and sensing model accuracy to be increased in restricted areas of the motion box, where points have already been collected in storage unit 194.

Adaptation accuracy evaluator 210 evaluates the result of the minimization executed by parameters adaptation module 208, and determines the increase or decrease in the accuracy value in the EM field model and the sensing coil calibration parameters using the results of the minimization. The evaluation is executed by computing the FOM values for each point involved in the adaptation performed by parameters adaptation module 208, using the updated EM field model parameters and sensing coil calibration parameters minimized by parameters adaptation module 208. The obtained distribution of FOM values for each point may be characterized by a single value, or a few values, such as the root mean square of the FOM distribution, the maximum FOM obtained, or any other distribution property. This value is then used by adaptation accuracy evaluator 210 to determine the increase or decrease in the accuracy value of system 140, as compared with the previous accuracy value of system 140. The previous accuracy value of system 140 can be determined by the obtained distribution of FOM values obtained for points using the non-minimized EM field model parameters and sensing coil calibration parameters (indicating the parameter values before parameters adaptation module 208 minimizes them). If a small increase in accuracy is observed, such that changing the EM field model stored in magnetic field model generator 190 is not warranted, adaptation accuracy evaluator 210 directs parameters adaptation module 208 to perform another minimization of the EM field model parameters and the sensing coil calibration parameters.

If no increase in accuracy is achieved, or an insignificant increase in accuracy is achieved, adaptation accuracy evaluator 210 directs parameters adaptation module 208 to expand Equation (11) by estimating the contribution of the next additional, higher order, mathematical gradient term in Equation (11) not currently used by magnetic flux to magnetic field converter 198. For example, if $F_{mk}$ was solved for, by magnetic flux to magnetic field converter 198, using only the first two terms on the right hand side of Equation (11), then, when parameters adaptation module 208 expands Equation (11), $F_{mk}$ is solved for, by magnetic flux to magnetic field converter 198, using the first three terms on the right hand side of Equation (11). The contribution of the additional term in Equation (11) can be estimated by using an approximation about the sensing coil form, and the EM field distribution within each sensing coil. If that contribution is not negligible, the expanded form of Equation (11) is used by parameters adaptation module 208 in another round of minimization calculations. The sensing coil calibration parameters may still yield distorted position estimates of the sensing coils. In this case, parameters adaptation module 208 repeatedly expands Equation (11), by estimating the contribution of the next additional, higher order, mathematical gradient term in Equation (11) not currently used by magnetic flux to magnetic field converter 198. If that contribution is negligible, or the expanded form of Equation (11) still does not yield the desired EM field model accuracy and sensing coil calibration accuracy, a trial and error technique is used by parameters adaptation module 208, to improve the accuracy of system 140.

The trial and error technique involves expanding the various expansion functions used by tracking processor 150, for example, the EM field model, or any of Equations (5), (6), (7), (9), (10), (11), by increasing the number of retained terms in these equations. The expansion can also involve adding a new mathematical expansion center to the expansion functions used by tracking processor 150. Parameters adaptation module 208 adds a new mathematical expansion center by determining the direction of the sharpest increase in the deviations minimized in Equations (15) and (16) (or Equations (17) and (18)). The direction of the sharpest increase indicates the direction of the singularity of EM field 160. The region near the singularity of the EM field is then determined by parameters adaptation module 208 and divided into a plurality of segments. Iteratively, the location of each segment is chosen as the location of the new mathematical expansion center, and is used in the minimizations executed using Equations (15) and (16) (or Equations (17) and (18)). The location of the segment which yields the lowest FOM is then added as the new mathematical expansion center.

In either case of expansion, the expanded equations are used in an additional minimization calculation. If the achieved accuracy value determined by adaptation accuracy evaluator 210 increases, the expanded equations are used for another minimization calculation. Minimization calculations are executed until the increase in accuracy value is sufficient to warrant replacing the current EM field model parameters stored in magnetic field model generator 190, by the updated, adapted EM field model parameters determined by parameters adaptation module 208. If the achieved accuracy value determined decreases, either the order of the retained expansion terms is increased, or a new mathematical expansion center is added. The trial and error technique is used by parameters adaptation module 208 until the desired system accuracy is achieved.

In general, parameters adaptation module 208 iteratively performs minimization calculations, either with or without expanding the sets of parameters searched for, until a satisfactory FOM level is achieved. When a satisfactory level of accuracy is achieved, parameters adaptation module 208 provides the adapted parameter sets of the EM field model parameters and the sensing coil calibration parameters to model comparer module 212. For a predetermined control time, model comparer module 212 provides position processor 200 with the adapted parameters determined by parameters adaptation module 208. The control time can be a few seconds or a few minutes depending on the case of usage of system 140. During the predetermined control time, model comparer module 212 compares the FOM of points determined by the current EM field model parameters and sensing coil calibration parameters, and by the respective adapted parameters. If the FOM provided by the respective adapted parameters is lower than the FOM provided by the current parameters, for most of the predetermined control time, model comparer module 212 directs magnetic field model generator 190, and storage unit 194, to replace the current parameters stored thereto, by the updated, adapted parameters. If the FOM provided by the adapted parameters is higher than the FOM provided by the current parameters, for most of the predetermined control time, the adapted parameters are abandoned, and model comparer module 212 directs parameters adaptation module 208 to perform more minimization calculations.

Figure 5A:
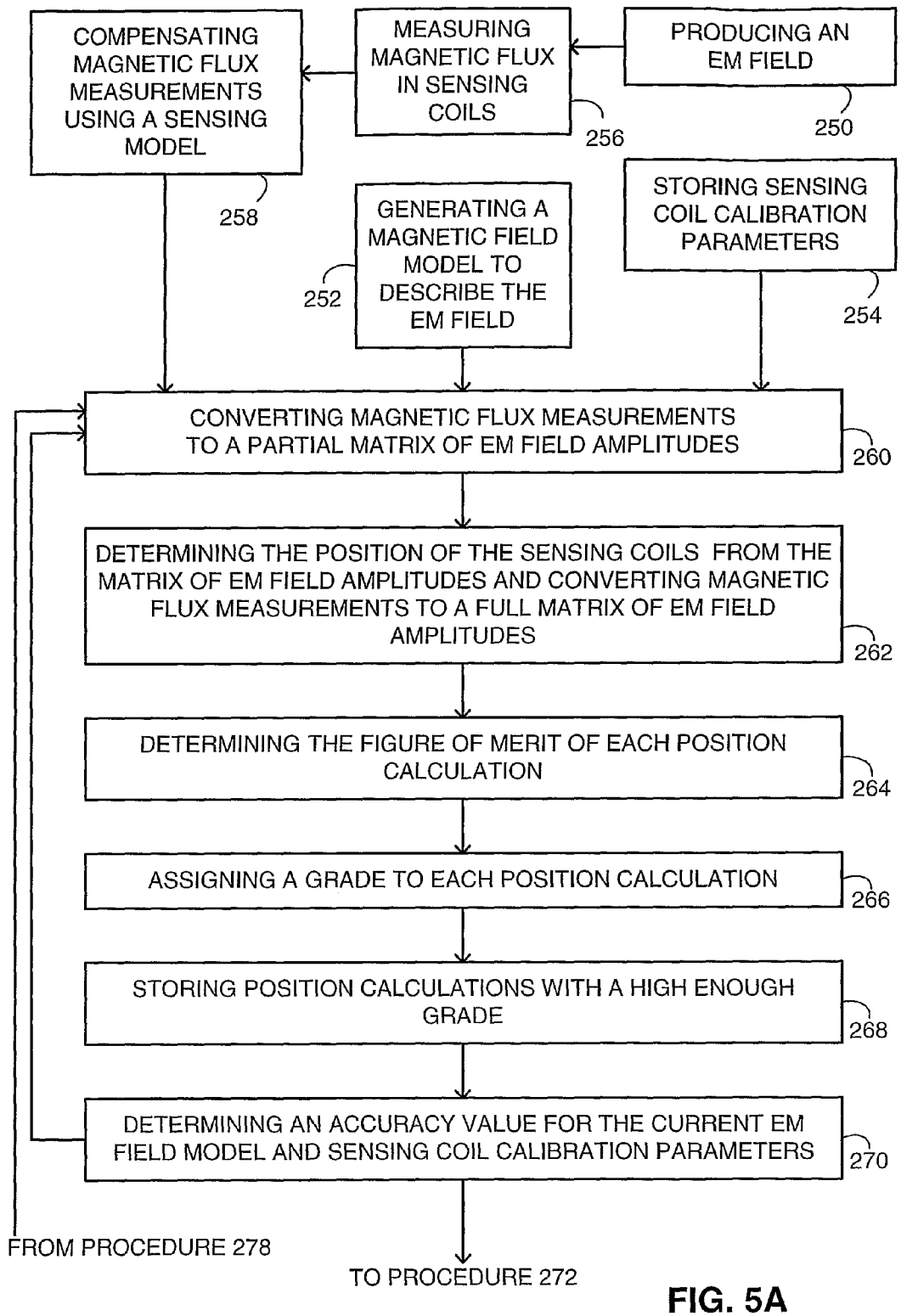
FIGS. 5A and 5B are a schematic illustration of a method, operative in accordance with an embodiment of the disclosed technique.
Figure 5B:
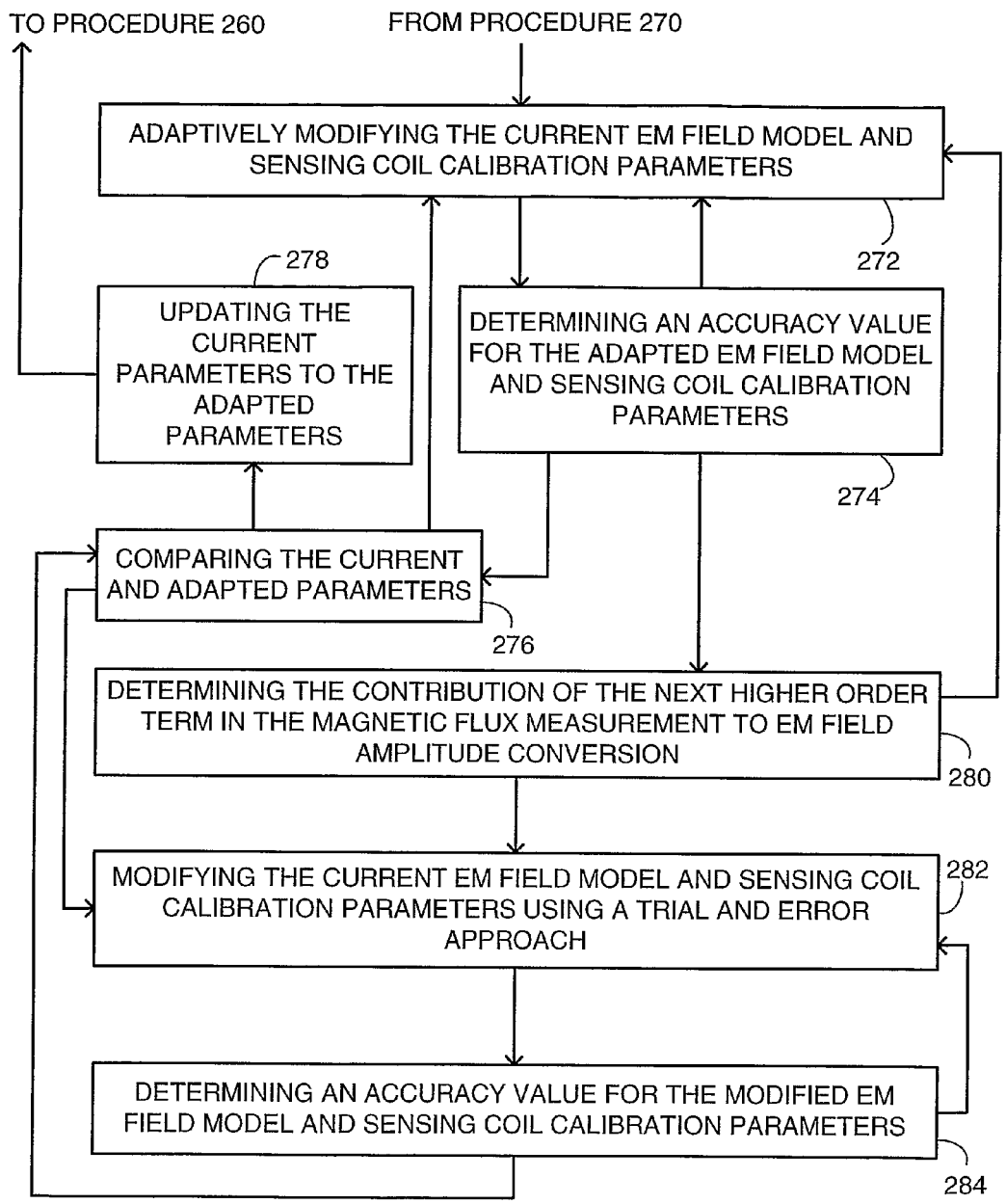

Reference is now made to FIGS. 5A and 5B, which are a schematic illustration of a method, constructed and operative in accordance with an embodiment of the disclosed technique. In procedure 250, a multiple axis EM field is provided to a motion box, where a tracked object moves about. The EM field is the superposition of the individual EM fields generated by transmission coils, each at different frequencies. With reference to FIG. 2, transmitter assembly 158 uses the generated respective amplified frequencies to provide a multiple axis EM field 160 to a motion box.

In procedure 252, an approximate mathematical model of an EM field, where a tracked object moves about, is generated. At this point in time, the model may not initially take into account all the relevant parameters required to accurately describe the EM field. The accuracy to which the model describes the EM field, at this point in time, is therefore initially low. The model can be substantially defined by Equation (3). The model is used for estimating the amplitude of the EM field detected in sensing coils associated with, or attached to, the tracked object, for all the transmission frequencies used to generate the EM field. Equation (3) may be constructed as either a linear or non-linear function with respect to the model parameters $\theta_{pm}$. When Equation (3) is chosen as a linear expansion, for example, in terms of a harmonic function, like Equation (4), each set of model parameters $\theta_{pm}$ estimates an independent contribution to $\hat{B}$ at each transmission frequency, m, used to generate the EM field. In an embodiment of the disclosed technique, the model has an efficient analytical or numerical method, for determining the mathematical gradients of the EM field model. With reference to FIG. 4, magnetic field model generator 190 generates and stores an approximate mathematical model of an EM field the tracked object is located in, substantially defined by Equation (3).

In procedure 254, calibration parameters of sensing coils, associated with, or attached to, the tracked object, are stored. A plurality of sensing coils may be grouped together in a sensor assembly. The calibration parameters can include the orientation of the sensing coils with respect to one another, and with respect to the sensor reference frame. The calibration parameters can further include a set of radius vectors $\vec{r}_k$, from the origin of the sensor reference frame to the magnetic center of each sensing coil. The calibration parameters can also include parameters relating to the electronic components of the sensing coils and the sensor assemblies, for example, the gain in the sensor assemblies, and parameters defining amplifiers used in the sensor assemblies. When an object is first tracked in an EM field, the relative rotation angles of the sensing coils with respect to one another, in each sensor assembly, are known with an error of several degrees and are stored. In addition, internal calibration parameters of the sensing coils, in each sensor assembly, are known with an error of a few percent, and are stored.

In procedure 254, a Taylor series expansion function describing the EM field amplitudes in sensing coils in general, is also stored. The Taylor series expansion functions are substantially defined by Equations (5), (6) and (7). With reference to FIG. 4, storage unit 194 stores calibration parameters related to sensor assemblies $162_1$, $162_2$, $162_3$ and $162_N$, as well as Taylor series expansion functions substantially defined by Equations (5), (6) and (7), describing the EM field amplitudes in the sensing coils in sensor assemblies $162_1$, $162_2$, $162_3$ and $162_N$.

In procedure 256, sensing coils attached to a tracked object, measure the voltage difference of the EM field passing through them. The voltage difference allows each of the sensing coils to correspondingly estimate the respective magnetic flux of the EM field passing there through. This indirect measurement of the magnetic flux is herein referred to as a measurement. The measured magnetic flux, in a steady state sensing coil, is assumed to follow a mathematical periodic function of time, defined by Equation (8). In order to estimate the amplitude and phase of the measured magnetic flux, multiple measurements of the flux are made in a time period T, known as a sampling window in the art, at a known frequency. The measurements are fit to Equation (8), using techniques known in the art. With reference to FIG. 2, sensor assemblies $162_1$, $162_2$, $162_3$ and $162_N$, which are associated with, or attached to, a tracked object, indirectly measure the magnetic flux passing through them multiple times, in a sampling window, at a known frequency, by measuring the voltage difference passing there through. With reference to FIG. 4, storage unit 194 stores the measured magnetic flux values of sensor assemblies $162_1$, $162_2$, $162_3$ and $162_N$, and estimates the amplitude and phase of the magnetic flux, by fitting the measured values to Equation (8) using techniques known in the art.

In procedure 258, the amplitude and phase of the magnetic flux estimated in procedure 256 is compensated for, because Equation (8) is valid only in the case of steady state, non-moving, sensing coils. In general, sensing coils associated with, or attached to, a tracked object are in constant motion. This motion can be described as a translational and rotational velocity of the sensing coils, and is manifest in the form of a non-periodic variation of magnetic flux as a function of time. If the sensing coils are in motion within a sampling window, the amplitude and phase of the magnetic flux, estimated in procedure 256, are inaccurate. The amplitude and phase of the magnetic flux estimated in procedure 256 needs to be compensated for the translational and rotational velocity of the sensing coils.

The compensation is executed by defining the amplitude and phase of the measured magnetic flux as Taylor series expansion functions, defined, in general, by Equations (9) and (10). The expansion terms (the right hand side terms) of Equations (9) and (10) are estimated by minimizing the deviation between the magnetic flux estimated in the sensor assemblies in procedure 256 and the magnetic flux determined by using Equation (8) with the estimated magnetic flux amplitude and phase. The expansion terms of Equations (9) and (10) are estimated anew each time procedure 256 is executed. The minimization is executed using a least mean square cost function, as is known in the art. In general, the number of expansion parameters needed, in Equations (9) and (10), to compensate for the effect of the translational and rotational velocity of the sensing coils, is known. In an embodiment of the disclosed technique, if the number of expansion parameters needed is not known, then when tracking of the object commences, the minimization is used to estimate the zero order terms, $F_m$ and $p_m$, for each transmission frequency used to produce the EM field, in each sensing coil. As the object is tracked, minimizations are repeatedly executed to estimate the higher order derivative terms until the number of terms retained in Equations (9) and (10) are sufficient to compensate for the translational and rotational velocity of the sensing coils.

Equations (9) and (10) can be truncated by retaining the terms up to the zero, first, second or any other higher order. The number of terms retained from Equations (9) and (10) depend on the following factors: the width of the sampling window, the typical velocity and acceleration of the tracked object, and the mathematical EM field gradients of the EM field model describing the EM field the tracked object is located in, or a combination of the above. The highest order term retained can be decided upon a priori or it can be treated as an adjustable parameter based on the normalized residual error between the EM field amplitudes estimated by the EM field model in procedure 252 and the EM field amplitudes estimated in procedure 262. For example, a normalized residual error of two to three σ (i.e. two to three standard deviations) may indicate that the highest order term retained in Equations (9) and (10) is increased by one. With reference to FIG. 4, sensor motion effect compensator 196 compensates for the error in the amplitude and phase of the magnetic flux estimated by storage unit 194 by using Equations (9) and (10) to continuously define the amplitude and phase of the magnetic flux as Taylor series expansion functions, each time a magnetic flux measurement is stored in storage unit 194. Sensor motion effect compensator 196 determines the terms anew, on the right hand side of Equations (9) and (10), by using a least mean square cost function.

It is noted that as a tracked object moves around in an EM field, the magnetic flux passing through sensing coils associated with, or attached to, the tracked object constantly changes. Procedures 256 and 258 are therefore executed constantly. It is further noted that procedures 252, 254 and 258 can be executed simultaneously.

In procedure 260, the magnetic flux measurements, measured and compensated for in procedures 256 and 258, are transformed into a corresponding matrix of magnetic field amplitudes by Equation (11). Transforming the magnetic flux measurements into magnetic field amplitudes requires the use of the EM field model and the sensing coil calibration parameters, respectively generated and stored in procedures 252 and 254. The magnetic field amplitude of the first term on the right hand side of Equation (11), $B_{mk}{}^\alpha(\vec{r}_k)$, can be solved for using techniques known in the art.

Equation (11) can be truncated by retaining the terms up to the zero, first, second or any other higher order of mathematical gradient. The highest order mathematical gradient term retained in solving for Equation (11) depends on the following factors: an estimation of the EM field model mathematical gradients and the approximate size of the sensing coils used. The highest order term retained may be chosen a priori based on the above factors or it can be treated as an adjustable parameter based on the normalized residual error between the EM field amplitudes estimated by the EM field model and the EM field amplitudes estimated in procedure 262. For example, a normalized residual error of one σ (i.e. one standard deviation) may indicate that the highest order term retained in Equation (11) is increased by one. With reference to FIG. 4, magnetic flux to magnetic field converter 198 transforms the magnetic flux measurements, estimated and compensated for in storage unit 194 and sensor motion effect compensator 196, using Equation (11), into a corresponding matrix of EM field amplitudes.

It is noted that the transformation of the compensated magnetic flux measurements, in procedure 258, into a corresponding matrix of EM field amplitudes, in procedure 260, can be executed by expanding Equations (5), (6), (7), (9) and (10) in terms of spherical functions, or other basic harmonic functions. In the case that spherical functions are used, the mathematical representation of the measured magnetic flux (for example, Equation (8)) will be a linear function of the expansion coefficients of the spherical expansion function. The parameters involved in the definition of this linear function represent the geometry of the sensing coils. Therefore, these parameters are analogous to the tensor coefficients of Equation (11). In general, any mathematical model relating the EM field amplitudes measured within a sensing coil to the measured magnetic flux in a sensing coil, can be used in place of Equation (11). For consistency, the Taylor series expansions of Equations (5), (6), (7), (9), (10) and (11) are used throughout the rest of the description of the disclosed technique.

A difficulty in solving for the higher order EM field amplitude terms in Equation (11) stems from not knowing the current position of the sensing coils. In procedure 262, the position of the sensing coils is determined and the higher order EM field amplitude terms in Equation (11) are solved for. In one embodiment of the disclosed technique, an extrapolation technique is used to estimate the position of the sensing coils, which can be used to estimate the higher order EM field amplitude terms in Equation (11). In this technique, the estimated position of the sensing coils is calculated, based on the previous position of the sensing coils. The previous position of the sensing coils is obtained from the center of the previous sampling window to the center of the current sampling window. The estimated position of the sensing coils is extrapolated from the center of the current sampling window to the center of the next sampling window. Using Equations (8), (9) and (10), all the measurements of the position of the sensing coils, at a particular time, are related to the center of the current respective sampling window. The extrapolation can be based on the following assumptions, for example, a fixed translational and rotational velocity of the sensing coils in one sampling window, or a fixed translational and rotational velocity of the sensing coils within a time duration between the center of two successive sampling windows. The extrapolated position of the sensing coils is used as the location where the gradients terms of Equation (11) are estimated.

In a second embodiment of the disclosed technique, an iterative technique, using the principles of perturbation theory, is used to determine the position of the sensing coils. In this technique, the EM field amplitude components are first estimated based on a simplified sensing coil model of point-like sensor assemblies. This is equivalent to solving Equation (11) with only the first term of the right hand side, as in procedure 260. The estimated EM field amplitude components are then used to approximate the position of each sensing coil. The position of each sensing coil is then used to estimate the gradient terms of Equation (11). The estimated gradients terms can then be used again to estimate the EM field amplitude components. The EM field amplitude components can then be used again to approximate the position of each sensing coil. The position of each sensing coil can then be used again to estimate the gradient terms of Equation (11). This technique is repeated, in an iterative manner, using the principles of perturbation theory, until a sufficient accuracy, in estimating both the position of the sensing coils and the EM field amplitude components, is achieved.

In a third embodiment of the disclosed technique, the position of the sensing coils as well as the higher order gradient terms of Equation (11) are determined simultaneously. The position of the sensing coils is estimated using Equation (12), which minimizes the deviation between the EM field amplitudes determined by the EM field model and the EM field amplitudes estimated by Equation (11). The higher order gradient terms of Equation (11) are estimated using Equation (13), which minimizes the deviation between the magnetic flux estimated in procedure 258 and the magnetic flux estimated from the EM field model. Equations (12) and (13) are solved by using a non-linear, least mean square optimization technique, for example, Newton's method, as is known in the art.

In procedure 264, the normalized residual error in the calculation of the position of the sensing coils is determined. The normalized residual error is referred to as the figure of merit (herein abbreviated FOM) of a position calculation. The FOM is substantially defined by Equation (14). With reference to FIG. 4, position processor 200 determines the position of the sensing coils using either extrapolation, iteration, or simultaneous minimization techniques. Position processor 200 also determines the FOM for each position calculation executed.

In procedure 266, each position calculation is grouped together with its corresponding compensated magnetic flux measurement in procedure 258, into an element referred to as a point. In procedure 266, each point is assigned a grade. The grade is a positive parameter dependent on the following factors: the FOM of the point, the geometrical location of the point in the motion box, and the grades assigned to already stored points. The factors each have relative weights in determining the grade. For example, a large FOM of a current point, compared to the FOM of already stored points, is an aspect which increases the grade, because such points help improve the EM field model. In addition, if the geometrical location of the point in the motion box is far enough from all the points already stored, it may also be a reason for increasing the grade of the current point. Position measurements with large FOMs are indicative of locations in the motion box not yet explored by the tracked object. Since these new locations help improve and expand the EM field model, such measurements may receive high grades. The grades of points already stored may also be varied with time. For example, the grades of points already stored may gradually decrease over time, introducing a fading memory effect to already stored points. With reference to FIG. 4, grade assignment module 202 assigns a grade to each point.

In procedure 268, points with a high enough grade are stored. A point is stored if its grade is above a certain minimal level and there is still room to store more points. If there is no room to store a point, and a point possesses a high enough grade for storage, the point is stored by replacing an already stored point with a lower grade. The numbers of points stored is, in general, determined by the number of unknowns that need to be determined in Equation (3) to properly generate an accurate EM field model of the EM field in which the tracked object is located in. Points with high enough grades are stored and used to refine the EM field model generated in procedure 252 and in calibrating the sensing coils by refining the calibration parameters of the sensing coils stored in procedure 254. With reference to FIG. 4, storage unit 194 stores points with a high enough grade.

In procedure 270, the accuracy to which sensing coil calibration parameters are known, and the accuracy to which the EM field model, generated in procedure 252, estimates the EM field amplitude components measured by the sensing coils, is determined. The determination of the accuracy is based on the following factors: the FOM of the accumulated points, the accuracy achieved so far, the accuracy expected by a user, and the mathematical observability of the parameters defining the EM field model and the sensing coil calibration parameters. If the determined accuracy is above the required level, the method returns to procedure 260, where the updated position of sensing coils are continuously estimated, along with their FOMs. The determined accuracy is generally above the required level when a majority of the points within a part of the motion box have been collected and have had grades assigned to them. If the determined accuracy is below the required level, the method proceeds to procedure 272. With reference to FIG. 4, model accuracy evaluator 206 determines the accuracy to which sensing coil calibration parameters are known, and the accuracy to which the EM field model estimates the EM field amplitude components measured and compensated, respectively, in storage unit 194 and sensor motion effect compensator 196.

In procedure 272, the current EM field model parameters and the current sensing coil calibration parameters are modified adaptively by solving Equations (15) and (16). In the case that a sensing coil is replaced, certain parameters in Equations (15) and (16) will not be known immediately after the sensing coil is replaced. In order to perform the adaptation of those parameters, Equations (17) and (18) are solved. The minimization executed in procedure 272 is similar to the minimization executed in procedure 262. The difference in the minimization between the two procedures is that in procedure 272, a minimization calculation involving all the points stored in procedure 268 is executed, whereas in procedure 262, a minimization is executed on only a single point.

Some of the parameters defining the EM field model and the calibration parameters of the sensing coils may be mathematically non-observable when the minimizations of Equations (15) and (16) (or Equations (17) and (18)) are executed. This is typical when a tracked object is in a new environment, the FOM of accumulated points is high, few points are stored, or an area of the physical motion box, with a low probability of being explored, for example, a corner of the physical motion box, has not yet been explored by the tracked object. In the case of few points being stored, a model simplification technique is used to execute the minimizations of Equations (15) and (16) (or Equations (17) and (18)). In the model simplification technique, non-observable parameters are either excluded from the EM field model and the minimization calculations, or they are considered as constants in the minimization calculations. Non-observable parameters can be selected using standard methods in estimation theory, for example, using Cramer-Rao bounds analysis, as is known in the art. The model simplification technique can also be used when an entire set of EM field model parameters $\theta_{mk}$ are non-observable, indicating that the EM field model structure and the sensing model structure have not yet been established. The EM field model structure is not established when the EM field model generated in procedure 252 cannot estimate the position of sensing coils, attached to a tracked object, to a high degree of accuracy. The sensing model structure is not established when the number of gradient terms in Equations (5), (6), (7) and (11), needed to properly estimate the position of the tracked object, has not yet been determined.

In the case that areas in the physical motion box, with a low probability of being explored, are being explored by the tracked object, a constraint technique is used to execute the minimizations of Equations (15) and (16) (or Equations (17) and (18)). In the constraint technique, all parameters, including non-observable ones, are considered in the minimization calculations, except the minimization calculations are performed under specific constraints. One such constraint could be that the EM field amplitude components, estimated by the EM field model generated in procedure 252, before and after the minimization calculations, be close to one another within a defined tolerance level. The constraint technique becomes a preferred technique to use when the EM field model structure and the sensing model structure have been established. The EM field model is established when the EM field model generated in procedure 252 can estimate the position of sensing coils, attached to a tracked object, to a high degree of accuracy. The sensing model structure is established when the number of gradient terms in Equations (5), (6), (7) and (11), needed to properly estimate the position of the tracked object, has been determined, but some parameters of those equations are non-observable.

The model simplification technique and the constraint technique allow the method to select the points with the highest grades to perform the minimization calculations. These techniques allow procedure 272 to start minimizing with very few points stored. The rapid onset of minimization calculations allow for an accelerated rate in minimizing parameters and a quick determination of an accurate EM field model. The rapid onset of minimization calculations also allows for an accelerated rate in calibrating the sensing coils and their respective sensor assemblies. The tracked object does not need to explore the entire motion box before an accurate EM field model can be generated and the sensing coils, and their respective sensor assemblies, attached to the tracked object are calibrated. The disclosed technique allows the EM field model accuracy to be increased in restricted areas of the motion box, where points have already been collected and stored. With reference to FIG. 4, parameters adaptation module 208 modifies and adapts the EM field model parameters and the sensing coil calibration parameters by executing the minimization equations substantially defined by Equations (15) and (16) (or Equations (17) and (18)). Parameters adaptation module 208 also utilizes the model simplification technique and the constraint technique to compensate for a lack of progress in adaptively modifying the EM field model parameters and the sensing coil calibration parameters.

In procedure 274, the result of the minimizations executed in procedure 272 is evaluated and used to determine the increase or decrease in accuracy in the EM field model and the sensing coil calibration parameters. The evaluation is executed by computing the FOM values for each point involved in the minimizations performed in procedure 272, using the updated EM field model parameters and sensing coil calibration parameters minimized in procedure 272. The obtained distribution of FOM values for each point may be characterized by a single value, or a few values, such as the root mean square of the FOM distribution, the maximum FOM obtained, or any other distribution property. This value is used in procedure 274 to determine the increase or decrease in the accuracy in estimating the position of a tracked object, as executed in procedure 262, as compared with a previous estimation of the position of the tracked object. The previous accuracy can be determined by the obtained distribution of FOM values obtained for points using the non-minimized EM field model parameters and sensing coil calibration parameters, indicating the parameter values before they are minimized in procedure 272. If a significant increase in accuracy is observed, such that changing the EM field model generated in procedure 252 is warranted, the method proceeds to procedure 276. If an increase in accuracy is observed, but the increase is insufficient to warrant changing the EM field model determined in procedure 252, the method returns to procedure 272. If no increase in accuracy is achieved, or a very insignificant increase in accuracy is achieved, the method proceeds to procedure 280. With reference to FIG. 4, adaptation accuracy evaluator 210 evaluates the result of the minimization executed by parameters adaptation module 208, and determines the increase or decrease in the accuracy value in the EM field model and the sensing coil calibration parameters using the results of the minimizations. The evaluation is executed by computing the FOM values for each point involved in the adaptation performed by parameters adaptation module 208, using the updated EM field model parameters and sensing coil calibration parameters minimized by parameters adaptation module 208.

In procedure 280, Equation (11) is expanded by estimating the contribution of the next additional, higher order, mathematical gradient term in Equation (11), which is not used in procedure 262. For example, if $F_{mk}$ is solved for, in procedure 262, using only the first two terms on the right hand side of Equation (11), then, in procedure 280, $F_{mk}$ is solved for using the first three terms on the right hand side of Equation (11). The contribution of the additional term in Equation (11) can be estimated by using an approximation about the sensing coil form, and the EM field distribution within each sensing coil. If that contribution is not negligible, the method returns to procedure 272, where the expanded form of Equation (11) is used in procedure 272 in another round of minimization calculations. The sensing coil calibration parameters may still yield distorted position estimates of the sensing coils. In this case, Equation (11) may be expanded by repeating procedure 280. If that contribution is negligible, or the expanded form of Equation (11) still does not yield the desired EM field model accuracy and sensing coil calibration accuracy, the method goes to procedure 282. With reference to FIG. 4, if that contribution is not negligible, the expanded form of Equation (11) is used by parameters adaptation module 208 in another round of minimization calculations. If that contribution is negligible, or the expanded form of Equation (11) still does not yield the desired EM field model accuracy and sensing coil calibration accuracy, a trial and error technique is used by parameters adaptation module 208, to improve the accuracy of system 140.

In procedure 282, a trial and error technique is used to improve the accuracy in determining the position of a tracked object. The trial and error technique involves expanding the various expansion functions used in procedures 252, 254, 258, 260, 262 and 272, for example, the EM field model, or any of Equations (5), (6), (7), (9), (10), (11). The expansion can also involve adding a new mathematical expansion center to the immediately preceding list of expansion functions and equations. A non-linear optimization technique is used to determine a relevant position for the new mathematical expansion center. The new mathematical expansion center is added by determining the direction of the sharpest increase in the deviations minimized in Equations (15) and (16) (or Equations (17) and (18)). The direction of the sharpest increase indicates the direction of the singularity of the EM field. The region near the singularity of the EM field is then determined and divided into a plurality of segments. Iteratively, the location of each segment is chosen as the location of the new mathematical expansion center, and is used in the minimizations executed using Equations (15) and (16) (or Equations (17) and (18)). The location of the segment which yields the lowest FOM is then added as the new mathematical expansion center. In either case of expansion, the expanded equations are used in an additional minimization calculation in procedure 282, similar to the minimization calculations executed in procedure 272. With reference to FIG. 4, a trial and error technique is used by parameters adaptation module 208, to improve the accuracy of system 140.

In procedure 284, the result of the minimizations executed in procedure 282 is evaluated and used to determine the increase or decrease in accuracy in the EM field model and the sensing coil calibration parameters. If the achieved accuracy determined in procedure 284 increases, the expanded equations are used for another minimization calculation, similar to the minimization calculations executed in procedure 272, until the increase in accuracy is enough for the current EM field model generated in procedure 252, to be replaced. Once the increase in accuracy is high enough for the current EM field model generated in procedure 252 to be replaced, the method proceeds to procedure 276. If the achieved accuracy determined decreases, the method returns to procedure 282, where either the order of the retained expansion terms is increased, or a new mathematical expansion center is chosen. The trial and error technique is used in procedure 282 until the desired accuracy is achieved. In general, minimization calculations, similar to the minimization calculations executed in procedure 272, are performed iteratively, either with, or without expanding the sets of parameters searched for, until a satisfactory FOM level is achieved. With reference to FIG. 4, adaptation accuracy evaluator 210, determines the increase or decrease in the accuracy of the EM field model and the sensing coil calibration parameters. If the achieved accuracy value determined by adaptation accuracy evaluator 210 increases, the expanded equations are used for another minimization calculation. Minimization calculations are executed until the increase in accuracy value is sufficient to warrant replacing the current EM field model parameters stored in magnetic field model generator 190, by the updated, adapted EM field model parameters determined by parameters adaptation module 208. If the achieved accuracy value determined decreases, either the order of the retained expansion terms is increased, or a new mathematical expansion center is added. The trial and error technique is used by parameters adaptation module 208 until the desired system accuracy is achieved.

When a satisfactory level of accuracy is achieved in procedure 284, the method proceeds to procedure 276. In procedure 276, the estimation of the position of a tracked object, as well as the sensing coil calibration parameters, from procedure 262, are compared with the respective estimation of the position of a tracked object, as well as the sensing coil calibration parameters, from procedures 272 or 282, for a fixed control time. The control time can be a few seconds or a few minutes depending on the case of usage in which the method is used in. During the fixed control time, the FOM of points determined by the current EM field model parameters and sensing coil calibration parameters, and the FOM of the points determined by the adapted parameters determined in procedures 272 and 282, are compared. If the FOM provided by the adapted parameters is lower than the FOM provided by the current parameters, for most of the fixed control time, then the method proceeds to procedure 278. If the FOM provided by the adapted parameters is higher than the FOM provided by the current parameters, for most of the control time, the adapted parameters are abandoned, and the method returns to either procedure 272 or procedure 282, depending on whether procedure 280 was executed or not. If procedure 280 was not executed, the method returns to procedure 272. If procedure 280 was executed, the method returns to procedure 282. With reference to FIG. 4, model comparer module 212 compares the FOM of points determined by the current EM field model parameters and sensor assembly calibration parameters, respectively stored in magnetic field model generator 190 and storage unit 194, and the FOM of points determined by the adapted parameters, determined by parameters adaptation module 208.

In procedure 278, the current parameters describing the EM field model and the sensing coil calibration parameters, are replaced by the updated, adapted parameters determined in procedures 272 and 282, if the FOM provided by the adapted parameters is lower than the FOM provided by the current parameters, for most of the fixed control time. With reference to FIG. 4, model comparer module 212 directs magnetic field model generator 190, and storage unit 194, to replace the current parameters stored thereto, by the updated, adapted parameters.

It will be appreciated by persons skilled in the art that the disclosed technique is not limited to what has been particularly shown and described hereinabove. Rather the scope of the disclosed technique is defined only by the claims, which follow.

The invention claimed is:

1. Apparatus, for adaptively tracking the position of an object in a volume of interest, the apparatus comprising:
   at least one transmitter, coupled with said volume of interest, for transmitting a multiple axis, time variant, electromagnetic field through said volume of interest;
   at least one sensor assembly, said at least one sensor assembly including at least three sensors, said at least three sensors arranged in a fixed configuration at different predetermined locations and orientations, said at least one sensor assembly being coupled with said object, each of said at least three sensors respectively measuring a respective component of said electromagnetic field; and a tracking processor, coupled with said at least one transmitter and said at least one sensor assembly; and at least three respective analog to digital converters, one for each of said at least three sensors, for converting each said measurement of a respective component of said electromagnetic field into a respective second digital representation of a signal;

wherein said tracking processor produces and adapts a mathematical field model describing said electromagnetic field, said mathematical field model is at least based on said multiple axis, time variant, electromagnetic field, said fixed configuration of said at least three sensors and said measured respective components of said electromagnetic field;

wherein said tracking processor further produces and adapts a mathematical sensing model, for compensating the effect of the translational and rotational velocity of each of said at least three sensors;

wherein said tracking processor estimates said position of said object from said measured respective components of said electromagnetic field, said field model and said sensing model;

wherein said tracking processor stores calibration parameters associated with said at least one sensor assembly; and wherein said position of said object includes the physical location of said object and the orientation of said object.

2. The apparatus according to claim 1, further comprising:

a transmitter interface, coupled with said processor, for producing a first digital representation of a signal;

at least one digital to analog converter, coupled with said transmitter interface, for converting said first digital representation of a signal into at least one analog signal; and an amplifier, coupled with said at least one transmitter and with said at least one digital to analog converter, for amplifying said at least one analog signal and providing each of the amplified at least one analog signal to a respective one of said at least one transmitter.

3. The apparatus according to claim 2, wherein said first digital representation of a signal includes measurements of current flowing in said at least one transmitter.

4. The apparatus according to claim 3, wherein said at least one transmitter synchronizes the measuring of said measurements of current flowing with the measuring of said respective components of said electromagnetic field.

5. The apparatus according to claim 2, wherein each said at least one analog signal is respective of at least one spatial axis.

6. The apparatus according to claim 1, further comprising:

a sensor interface, coupled with said at least three respective analog to digital converters and with said processor.

7. The apparatus according to claim 6, further comprising:

at least one respective multiplexer, for each of said at least three respective analog to digital converters, for coupling said at least three respective analog to digital converters with said sensor interface.

8. The apparatus according to claim 1, wherein said tracking processor comprises:

a position processor, for determining the position of said at least three sensors;

a magnetic field model generator, coupled with said position processor, for generating said mathematical field model; and a magnetic flux to magnetic field converter, coupled with said magnetic field model generator and with said position processor, for partially transforming said measured respective components of said electromagnetic field into a measure of the amplitude components of said electromagnetic field.

9. The apparatus according to claims 8, wherein said tracking processor further comprises a storage unit, coupled with said magnetic flux to magnetic field converter, for storing said calibration parameters associated with said at least one sensor assembly and said measured respective components of said electromagnetic field.

10. The apparatus according to claim 8, wherein said tracking processor further comprises a sensor motion effect compensator, coupled with said magnetic flux to magnetic field converter and with said position processor, for compensating the effect of the translational and rotational velocity of each of said at least three sensors.

11. The apparatus according to claim 10, wherein said tracking processor further comprises a grade assignment module, coupled with said position processor, for assigning grades to the estimated position of said at least three sensors.

12. The apparatus according to claim 8, wherein said tracking processor further comprises a model accuracy evaluator, coupled with said position processor, for evaluating the accuracy to which said calibration parameters are known and the accuracy to which said mathematical field model estimates said measure of the amplitude components of said electromagnetic field by said at least three sensors.

13. The apparatus according to claim 8, wherein said tracking processor further comprises a parameters adaptation module coupled with said position processor, for adapting said calibration parameters and the parameters defining said mathematical field model and said mathematical sensing model.

14. The apparatus according to claim 13, wherein said tracking processor further comprises an adaptation accuracy evaluator, coupled with said parameter adaptation module, for evaluating the accuracy of an adapted mathematical field model and an adapted mathematical sensing model.

15. The apparatus according to claim 8, wherein said tracking processor further comprises a model comparer module, coupled with said position processor, for comparing said mathematical field model and said mathematical sensing model with an adapted mathematical field model and an adapted mathematical sensing model.

16. The apparatus according to claim 1, wherein said mathematical field model comprises at least one of:

a harmonic expansion function describing said electromagnetic field;

an analytic relation describing said electromagnetic field;

at least one parameter set describing said electromagnetic field;

a matrix function for estimating amplitude components of said electromagnetic field;

a model reference frame coordinate system between said object and said volume of interest;

a sensor reference frame coordinate system between said at least three sensors and said at least one sensor assembly; and a relationship between said model reference frame coordinate system and said sensor reference frame coordinate system.

17. The apparatus according to claim 16, wherein said at least one parameter set is selected from the list consisting of:

a coordinate relationship between said at least one transmitter and said at least three sensors;

at least one expansion center for each of said mathematical field model and said mathematical sensing model;

at least one expansion coefficient for each of said mathematical field model and said mathematical sensing model.

18. The apparatus according to claim 1, wherein said respective components of said electromagnetic field are related to the flux of said electromagnetic field.

19. The apparatus according to claim 16, wherein said matrix function for estimating comprises estimating said amplitude components from an observation point within each of said at least three sensors.

20. The apparatus according to claim 19, wherein said observation point is the magnetic center of each of said at least three sensors.

21. The apparatus according to claim 16, wherein said relationship comprises:
at least three respective radius vectors, from the origin of said sensor reference frame to an observation point in each of said at least three sensors;
at least one rotation matrix, for relating the orientation of said sensor reference frame to the orientation of said model reference frame; and
at least one vector, for relating the location of the origin of said sensor reference frame relative to said model reference frame.

22. The apparatus according to claim 16, wherein said calibration parameters are selected from the list consisting of:
the orientation of each of said at least three sensors with respect to said sensor reference frame;
at least three respective radius vectors, from the origin of said sensor reference frame to an observation point in each of said at least three sensors;
the gain characteristics of each of said at least one sensor assembly;
parameters relating to the electronic components of said at least one sensor assembly; and
the known error characteristics of said calibration parameters.

23. The apparatus according to claim 10, wherein said measured respective components of said electromagnetic field are expected to follow a mathematical periodic function of time, wherein said sensor motion effect compensator uses said measured respective components of said electromagnetic field to estimate an amplitude and a phase of said mathematical periodic function of time.

24. The apparatus according to claim 1, wherein said measured respective components of said electromagnetic field are expected to follow a mathematical periodic function of time, wherein said mathematical sensing model comprises:
a mathematical definition of at least one of an amplitude and a phase of said mathematical periodic function of time, as a function of time.

25. The apparatus according to claim 24, wherein said at least one function of time is expressed mathematically as at least one expansion function, wherein at least one expansion parameter of said at least one function of time is estimated each time said measured respective components of said electromagnetic field are acquired.

26. The apparatus according to claim 25, wherein said tracking processor estimates said at least one expansion parameter by minimizing the deviation between said measured respective components of said electromagnetic field and said mathematical periodic function of time.

27. The apparatus according to claim 24, wherein the number of expansion parameters of said at least one function of time depends on at least one of:
a predetermined time period wherein said measured respective components of said electromagnetic field are measured;
the typical velocity and acceleration of said object; and
mathematical field gradients of said mathematical field model.

28. The apparatus according to claim 27, wherein said number of said expansion parameters is fixed.

29. The apparatus according to claim 27, wherein said tracking processor adapts said mathematical sensing model by varying said number of said expansion parameters.

30. The apparatus according to claim 29, wherein said varying by said tracking processor depends on a figure of merit.

31. The apparatus according to claim 8, wherein said tracking processor performs said partial transformation, by expanding an expansion function, for each respective component of said electromagnetic field, and by expanding at least one of an amplitude and a phase of a mathematical periodic function of time, as at least one function of time, in terms of a basic harmonic function.

32. The apparatus according to claim 31, wherein said basic harmonic function comprises expansion coefficients, wherein said expansion coefficients relate said respective measured components of said electromagnetic field to said mathematical field model and to mathematical field gradients of said mathematical field model.

33. The apparatus according to claim 32, wherein said tracking processor modifies and adapts said expansion coefficients.

34. The apparatus according to claim 31, wherein the number of expansion terms of said basic harmonic function depends on at least one of:
the approximate size of said at least three sensors; and
an estimation of the gradients of said mathematical field model.

35. The apparatus according to claim 34, wherein said number of expansion terms is fixed.

36. The apparatus according to claim 34, wherein said mathematical field model is adapted by said tracking processor by varying said number of expansion terms.

37. The apparatus according to claim 36, wherein said varying by said position processor and said magnetic flux to magnetic field converter depends on a figure of merit.

38. The apparatus according to claim 8, wherein said magnetic flux to magnetic field converter transforms the remaining portion of said transformation by extrapolating the position of said at least three sensors, and estimating the mathematical field gradients of said basic harmonic function at said extrapolated position.

39. The apparatus according to claim 38, wherein said extrapolation is based upon an assumption, wherein said assumption is selected from the list consisting of:
a fixed translational and rotational velocity of said at least three sensors in a predetermined time period; and
a fixed translational and rotational velocity of said at least three sensors between the center of two predetermined time periods.

40. The apparatus according to claim 8, wherein said magnetic flux to magnetic field converter and said position processor, transform the remaining portion of said transformation by iteratively estimating said amplitude components of said electromagnetic field, based on a model of said at least three sensors as volumeless point-like sensors, estimating the position of said at least three sensors, and estimating the mathematical gradient terms of said basic harmonic function.

41. The apparatus according to claim 8, wherein said position processor transforms the remaining portion of said transformation by minimizing the deviation between said respective measured components of said electromagnetic field compensated for by a sensor motion effect compensator, and respective components of said electromagnetic field estimated from said mathematical field model.

42. The apparatus according to claim 41, wherein said position processor determines the position of said at least three sensors, thereby determining the position of said object, based on said mathematical field model, by minimizing the deviation between estimates of said amplitude components based on said mathematical field model and estimates of said amplitude components estimated from said remaining portion of said transformation.

43. The apparatus according to claim 8, wherein said position processor determines a figure of merit,
wherein said figure of merit is defined as the normalized residual error of the minimization of the deviation between estimates of said amplitude components based on said mathematical field model and estimates of said amplitude components estimated from a remaining portion of said transformation,
wherein said mathematical field model comprises:
at least one parameter set describing said electromagnetic field;
a matrix function for estimating said amplitude components of said electromagnetic field; and
a relationship between a model reference frame coordinate system and a sensor reference frame coordinate system,
wherein said relationship comprises:
at least three respective radius vectors, from the origin of said sensor reference frame to an observation point within each of said at least three sensors;
at least one rotation matrix, for relating the orientation of said sensor reference frame to the orientation of said model reference frame; and
at least one vector, for relating the location of the origin of said sensor reference frame to said model reference frame,
wherein said figure of merit is defined mathematically as $$FOM = \sqrt{\frac{1}{N_f N_c} \sum_{m=1}^{N_f} \sum_{k=1}^{N_c} \frac{\|B_{mk}^\alpha - \Phi_{mk}^\alpha(\theta_{11}, \ldots, \theta_{SN_f}, P^*, O^*, \vec{r}_1, \ldots, \vec{r}_{N_c})\|^2}{\|B_{mk}^\alpha\|^2}}$$

wherein $N_f$ is defined as the total number of analog signals generated by said at least one transmitter, $N_c$ is defined as the total number of said at least three sensors, $B_{mk}^\alpha$ is defined as the estimated amplitude components of said electromagnetic field at frequency m in sensor k, and $\Phi_{mk}^\alpha(\theta_{11}, \ldots, \theta_{SN_f}, P^*, O^*, \vec{r}_1, \ldots, \vec{r}_{N_c})$ is said matrix function, wherein wherein $\theta_{11}, \ldots, \theta_{SN_f}$ is defined as said at least one parameter set, $P^*$ is defined as the estimated location of said object, $O^*$ is defined as the estimated orientation of said object, and and $\vec{r}_1, \ldots, \vec{r}_{N_c}$ is defined as said radius vectors.

44. The apparatus according to claim 8, wherein said tracking processor further comprises a grade assignment module, coupled with said position processor,
wherein said grade assignment module groups together said respective measured components of said electromagnetic field compensated for by a sensor motion effect compensator and said estimated position of said object, based on said mathematical field model, into at least one point.

45. The apparatus according to claim 44, wherein said grade assignment module assigns said at least one point at least one grade,
wherein said at least one grade depends on at least one factor selected from the list consisting of:
a figure of merit of said at least one point;
the position of said at least one point in said volume of interest; and
grades assigned to previous points;
wherein each of said at least one factor has a relative weight.

46. The apparatus according to claim 45, wherein said grade assignment module lowers the value of said at least one grade, over time.

47. The apparatus according to claim 8, wherein said tracking processor further comprises a model accuracy evaluator, coupled with said position processor,
wherein said model accuracy evaluator evaluates the accuracy to which said calibration parameters are known and the accuracy to which said mathematical field model estimates said amplitude components of said electromagnetic field estimated by said at least three sensors.

48. The apparatus according to claim 47, wherein said determination of the accuracy depends on at least one of:
a figure of merit for accumulated measurements of said measured respective components of said electromagnetic field;
the accuracy of said apparatus achieved so far;
the desired accuracy of said apparatus;
the mathematical observability of at least one parameter set, said at least one parameter set describing said electromagnetic field; and
said calibration parameters.

49. The apparatus according to claim 8, wherein said tracking processor further comprises a parameters adaptation module coupled with said position processor and with said magnetic field model generator,
wherein said parameters adaptation module adapts at least one of:
at least one parameter set describing said electromagnetic field;
said calibration parameters; and
the expansion parameters of at least one function of time expressed as an expansion function,
wherein at least one of an amplitude and a phase of a mathematical periodic function of time is expressed as said at least one function of time,
by minimizing at least one of:
the deviation between estimates of said amplitude based on said mathematical field model and values of said amplitude estimated from a basic harmonic function; and
the deviation between said measured respective components of said electromagnetic field, compensated by said mathematical periodic function of time, and estimates of said respective components of said electromagnetic field based on said mathematical field model.

50. The apparatus according to claim 49, wherein said tracking processor further comprises an adaptation accuracy evaluator coupled with said position processor and with said parameters adaptation module,
wherein said adaptation accuracy evaluator evaluates the accuracy to which said mathematical field model estimates the amplitude of said electromagnetic field estimated by said at least three sensors and the accuracy in said calibration parameters, after said minimizing.

51. The apparatus according to claim 50, wherein said adaptation accuracy evaluator evaluates said accuracy by computing a figure of merit for each said measured respective components, of said electromagnetic field, used in said minimizing.

52. Method, for adaptively tracking the position of an object in a volume of interest, comprising the procedures of:
   transmitting a multiple axis, time variant, electromagnetic field through said volume of interest;
   measuring a respective component of said electromagnetic field, in at least one sensor assembly, said at least one sensor assembly including at least three sensors, said at least three sensors arranged in a fixed configuration at different predetermined locations and orientations;
   producing a mathematical field model describing said electromagnetic field, said field model based on said multiple axis, time variant, electromagnetic field, said fixed configuration of said at least three sensors and said measured respective components of said electromagnetic field;
   producing a mathematical sensing model, for compensating the effect of the translational and rotational velocity of each of said at least three sensors; and
   determining said position of said object, from said measured respective components of said electromagnetic field, said field model and said sensing model,
   wherein said position of said object includes the physical location of said object and the orientation of said object.

53. The method according to claim 52, wherein said mathematical field model comprises at least one of:
   a harmonic expansion function describing said electromagnetic field;
   an analytic relation describing said electromagnetic field;
   at least one parameter set describing said electromagnetic field;
   a matrix function for estimating amplitude components of said electromagnetic field;
   a model reference frame coordinate system between said object and said volume of interest;
   a sensor reference frame coordinate system between said at least three sensors and said at least one sensor assembly; and
   a relationship between said model reference frame coordinate system and said sensor reference frame coordinate system.

54. The method according to claim 52, wherein said respective components of said electromagnetic field are related to the flux of said electromagnetic field.

55. The method according to claim 53, wherein said matrix function for estimating comprises estimating said amplitude components from an observation point within each of said at least three sensors.

56. The method according to claim 53, wherein said relationship comprises:
   at least three respective radius vectors, from the origin of said sensor reference frame to an observation point in each of said at least three sensors;
   at least one rotation matrix, for relating the orientation of said sensor reference frame to the orientation of said model reference frame; and
   at least one vector, for relating the location of the origin of said sensor reference frame relative to said model reference frame.

57. The method according to claim 52, further comprising the procedure of storing calibration parameters associated with said at least three sensors.

58. The method according to claim 57, wherein said calibration parameters are selected from the list consisting of:
   the orientation of each of said at least three sensors with respect to a sensor reference frame;
   at least three respective radius vectors, from the origin of said sensor reference frame to an observation point in each of said at least three sensors;
   the gain characteristics of each of said at least one sensor assembly;
   parameters relating to the electronic components of said at least one sensor assembly; and
   the known error characteristics of said calibration parameters.

59. The method according to claim 52, wherein said mathematical field model is constructed as a function selected from the list consisting of:
   a linear function; and
   a non-linear function.

60. The method according to claim 52, further comprising the procedure of storing an expansion function for each respective component of said electromagnetic field.

61. The method according to claim 52, further comprising the procedure of estimating an amplitude and a phase of a mathematical periodic function of time associated with said measured respective components of said electromagnetic field.

62. The method according to claim 52, wherein said measured respective components of said electromagnetic field are expected to follow a mathematical periodic function of time, wherein said mathematical sensing model comprises:
   a mathematical definition of at least one of said amplitude and said phase of said mathematical period function of time, as a function of time.

63. The method according to claim 62, wherein said at least one function of time is expressed mathematically as at least one expansion function, wherein at least one expansion parameter of said at least one function of time is estimated each time said measured respective components of said electromagnetic field are acquired.

64. The method according to claim 63, further comprising the procedure of estimating said at least one expansion parameter by minimizing the deviation between said measured respective components of said electromagnetic field and said mathematical periodic function of time.

65. The method according to claim 63, wherein the number of expansion parameters of said at least one function of time depends on at least one of:
   a predetermined time period wherein said measured respective components of said electromagnetic field are measured;
   the typical velocity and acceleration of said object; and
   mathematical field gradients of said mathematical field model.

66. The method according to claim 65, wherein said number of said expansion parameters is fixed.

67. The method according to claim 65, further comprising the procedure of adapting said mathematical sensing model by varying said number of said expansion parameters.

68. The method according to claim 67, wherein said procedure of varying depends on a figure of merit.

69. The method according to claim 52, further comprising the procedure of partially transforming said measured respective components of said electromagnetic field into a partial estimate of the amplitude components of said electromagnetic field, by expanding an expansion function, for each respective component of said electromagnetic field, and by expanding at least one of an amplitude and a phase of a mathematical periodic function of time, as at least one function of time, in terms of a basic harmonic function.

70. The method according to claim 69, wherein said basic harmonic function comprises at least one expansion coefficient, wherein said at least one expansion coefficient relates said respective measured components of said electromagnetic field to said mathematical field model and to mathematical field gradients of said mathematical field model.

71. The method according to claim 70, further comprising the procedure of adapting said expansion coefficients.

72. The method according to claim 69, wherein the number of expansion terms of said basic harmonic function depends on at least one of:
the approximate size of said at least three sensors; and
an estimation of the gradients of said mathematical field model.

73. The method according to claim 72, wherein said number of expansion terms is fixed.

74. The method according to claim 72, further comprising the procedure of adapting said mathematical field model by varying said number of expansion terms.

75. The method according to claim 74, wherein said procedure of varying depends on a figure of merit.

76. The method according to claim 69, further comprising the procedure of transforming said respective partial estimates of said amplitude components of said electromagnetic field into full respective estimates of said amplitude components of said electromagnetic field, by extrapolating the position of said at least three sensors, and estimating the mathematical field gradients of said basic harmonic function at said extrapolated position.

77. The method according to claim 76, wherein said extrapolation is based upon an assumption, wherein said assumption is selected from the list consisting of:
a fixed translational and rotational velocity of said at least three sensors in a predetermined time period; and
a fixed translational and rotational velocity of said at least three sensors between the center of two predetermined time periods.

78. The method according to claim 69, further comprising the procedure of transforming said respective partial estimates of said amplitude components of said electromagnetic field into full respective estimates of said amplitude components of said electromagnetic field, by iteratively estimating said amplitude components of said electromagnetic field, based on a model of said at least three sensors as volumeless point-like sensors, estimating the position of said at least three sensors, and estimating the mathematical gradient terms of said basic harmonic function.

79. The method according to claim 69, further comprising the procedure of transforming said respective partial estimates of said amplitude components of said electromagnetic field into full respective estimates of said amplitude components of said electromagnetic field, by minimizing the deviation between compensated respective measured components of said electromagnetic field, and respective components of said electromagnetic field estimated from said mathematical field model.

80. The method according to claim 79, further comprising the procedure of determining the position of said at least three sensors, thereby determining the position of said object, based on said mathematical field model, by minimizing the deviation between estimates of said amplitude components based on said mathematical field model and estimates of said amplitude components estimated from said procedure of transforming said respective partial estimates of said amplitude components.

81. The method according to claim 52, further comprising the procedure of assigning a grade to each said estimated position of said object.

82. The method according to claim 52, further comprising the procedure of grouping together said respective measured components of said electromagnetic field, compensated for by said mathematical sensing model, and said estimated position of said object, based on said mathematical field model, into at least one point.

83. The method according to claim 82, further comprising the procedure of assigning at least one grade to said at least one point,
wherein said at least one grade depends on at least one factor selected from the list consisting of:
a figure of merit of said at least one point;
the position of said at least one point in said volume of interest; and
grades assigned to previous points;
wherein each of said at least one factor has a relative weight.

84. The method according to claim 83, further comprising the procedure of lowering the value of said at least one grade, over time.

85. The method according to claim 52, further comprising the procedure of evaluating the accuracy to which calibration parameters, associated with said at least three sensors, are known and the accuracy to which said mathematical field model estimates said amplitude components of said electromagnetic field estimated by said at least three sensors.

86. The method according to claim 85, wherein said procedure of evaluating the accuracy depends on at least one of:
a figure of merit for accumulated measurements of said measured respective components of said electromagnetic field;
the accuracy achieved so far;
the desired accuracy;
the mathematical observability of at least one parameter set, said at least one parameter set describing said electromagnetic field; and
said calibration parameters.

87. The method according to claim 52, further comprising the procedure of determining a figure of merit for each said estimated position of said object.

88. The method according to claim 52, further comprising the procedure of adaptively modifying at least one of:
said mathematical field model; and
said mathematical sensing model.

89. The method according to claim 52, further comprising the procedure of adapting at least one of:
at least one parameter set describing said electromagnetic field;
at least one calibration parameter, associated with said at least three sensors; and
the expansion parameters of at least one function of time expressed as an expansion function,
wherein at least one of an amplitude and a phase of a mathematical periodic function of time is expressed as said at least one function of time,
by minimizing at least one of:
the deviation between estimates of amplitude components of said electromagnetic field based on said mathematical field model and values of said amplitude components estimated from a basic harmonic function; and the deviation between said measured respective components of said electromagnetic field, compensated by said mathematical periodic function of time, and estimates of said respective components of said electromagnetic field based on said mathematical field model.

90. The method according to claim 89, wherein said procedure of minimizing includes at least one sub-procedure selected from the list consisting of:
minimizing said deviations by excluding non-observable parameters from said minimizations;
minimizing said deviations by considering said non-observable parameters as constants; and
minimizing said deviations under at least one mathematical constraint.

91. The method according to claim 89, further comprising the procedure of evaluating the accuracy to which said mathematical field model estimates the amplitude components of said electromagnetic field estimated by said at least three sensors and the accuracy in said calibration parameters, after said minimizing.

92. The method according to claim 91, wherein said procedure of evaluating comprises computing a figure of merit for each said measured respective component, of said electromagnetic field, used in said minimizing.

93. The method according to claim 52, further comprising the procedure of determining an accuracy value for parameters defining said mathematical field model, said mathematical sensing model and calibration parameters associated with said at least three sensors.

94. The method according to claim 52, further comprising the procedure of determining an accuracy for at least one of:
an adapted model of said mathematical field model; and
an adapted model of said mathematical sensing model.

95. The method according to claim 52, further comprising the procedure of adding an expansion center to at least one of:
said mathematical field model; and
said mathematical sensing model.

96. The method according to claim 52, further comprising the procedure of comparing at least one of:
an adapted model of said mathematical filed model; and
an adapted model of said mathematical sensing model,
with at least a respective one of:
said mathematical field model; and
said mathematical sensing model,
said procedure of comparing being performed on a competitive basis, for a predetermined amount of time.

* * * * *